US012349197B2

(12) United States Patent
Landis et al.

(10) Patent No.: US 12,349,197 B2
(45) Date of Patent: Jul. 1, 2025

(54) INCREASING RANDOM ACCESS COVERAGE

(71) Applicant: QUALCOMM Incorporated, San Diego, CA (US)

(72) Inventors: Shay Landis, Hod Hasharon (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 17/204,799

(22) Filed: Mar. 17, 2021

(65) Prior Publication Data

US 2022/0304061 A1    Sep. 22, 2022

(51) Int. Cl.
*H04W 74/0833* (2024.01)
(52) U.S. Cl.
CPC .............................. *H04W 74/0833* (2013.01)
(58) Field of Classification Search
CPC .................................................. H04W 74/0833
See application file for complete search history.

(56) References Cited

U.S. PATENT DOCUMENTS

| 2019/0082333 | A1* | 3/2019 | Malik | H04W 24/10 |
| 2019/0313393 | A1* | 10/2019 | Wang | H04B 17/309 |
| 2020/0100297 | A1* | 3/2020 | Agiwal | H04B 17/318 |
| 2020/0145080 | A1* | 5/2020 | Tang | H04B 7/088 |
| 2020/0212986 | A1* | 7/2020 | Nilsson | H04B 7/0695 |
| 2020/0229157 | A1* | 7/2020 | Rastegardoost | H04W 74/0833 |
| 2020/0267768 | A1* | 8/2020 | Hakola | H04B 7/0408 |
| 2020/0336194 | A1* | 10/2020 | Karjalainen | H04B 7/0695 |
| 2020/0350971 | A1* | 11/2020 | Hakola | H04L 1/1812 |
| 2021/0036762 | A1* | 2/2021 | Abedini | H04W 16/26 |
| 2021/0297871 | A1* | 9/2021 | Guthmann | H04B 7/088 |
| 2021/0360702 | A1* | 11/2021 | Jang | H04W 74/006 |

* cited by examiner

*Primary Examiner* — Chuong M Nguyen
(74) *Attorney, Agent, or Firm* — Holland & Hart LLP

(57) ABSTRACT

Methods, systems, and devices for wireless communications are described. A user equipment (UE) may receive a first indication of a first set of random access occasions associated with a synchronization signal block that corresponds with a first receive beam of a base station. The UE may receive a second indication of a second set of random access occasions that are each associated with a respective receive beam of a set of receive beams of the base station. Each receive beam of the set of receive beams may spatially overlap a portion of the first receive beam. The UE may transmit the random access message using a selected random access occasion of the second set of random access occasions.

30 Claims, 13 Drawing Sheets

INCREASING RANDOM ACCESS COVERAGE

FIELD OF TECHNOLOGY

The following relates to wireless communications, including techniques for increasing random access coverage.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A base station and UE may engage in a random access procedure. Techniques for improving the coverage of random access procedures may be desired.

SUMMARY

The described techniques relate to improved methods, systems, devices, and apparatuses that support increasing random access coverage. A base station may use a transmit beam to transmit a corresponding synchronization signal block (SSB) for a random access procedure. A user equipment (UE) that receives the SSB may transmit an initial random access message to the base station based on receiving the SSB. The UE may transmit the initial random access message using a random access occasion associated with a narrow receive beam that partially overlaps a wide receive beam corresponding to the transmit beam for the SSB. The base station may use the narrow receive beam to receive the initial random access message.

A method for wireless communication at a UE is described. The method may include receiving a first indication of a first set of random access occasions associated with a synchronization signal block that corresponds with a first receive beam of a base station, receiving a second indication of a second set of random access occasions that are each associated with a respective receive beam of a set of receive beams of the base station, each receive beam of the set of receive beams spatially overlapping a portion of the first receive beam, and transmitting a random access message using a selected random access occasion of the second set of random access occasions.

An apparatus for wireless communication at a UE is described. The apparatus may include a processor, memory coupled with the processor, and instructions stored in the memory. The instructions may be executable by the processor to cause the apparatus to receive a first indication of a first set of random access occasions associated with a synchronization signal block that corresponds with a first receive beam of a base station, receive a second indication of a second set of random access occasions that are each associated with a respective receive beam of a set of receive beams of the base station, each receive beam of the set of receive beams spatially overlapping a portion of the first receive beam, and transmit a random access message using a selected random access occasion of the second set of random access occasions.

Another apparatus for wireless communication at a UE is described. The apparatus may include means for receiving a first indication of a first set of random access occasions associated with a synchronization signal block that corresponds with a first receive beam of a base station, means for receiving a second indication of a second set of random access occasions that are each associated with a respective receive beam of a set of receive beams of the base station, each receive beam of the set of receive beams spatially overlapping a portion of the first receive beam, and means for transmitting the random access message using a selected random access occasion of the second set of random access occasions.

A non-transitory computer-readable medium storing code for wireless communication at a UE is described. The code may include instructions executable by a processor to receive a first indication of a first set of random access occasions associated with a synchronization signal block that corresponds with a first receive beam of a base station, receive a second indication of a second set of random access occasions that are each associated with a respective receive beam of a set of receive beams of the base station, each receive beam of the set of receive beams spatially overlapping a portion of the first receive beam, and transmit a random access message using a selected random access occasion of the second set of random access occasions.

In some examples of the method, apparatuses, and non-transitory computer-readable medium described herein, transmitting the random access message may include operations, features, means, or instructions for transmitting the random access message as an initial random access message of a two-step random access procedure or a four-step random access procedure.

Some examples of the method, apparatuses, and non-transitory computer-readable medium described herein may further include operations, features, means, or instructions for transmitting the random access message using one of the first set of random access occasions, determining that the UE failed to receive a random access response associated with the transmission of the random access message using the one of the first set of random access occasions, and determining to transmit the random access message using the selected random access occasion of the second set of random access occasions based on the failure to receive the random access response.

Some examples of the method, apparatuses, and non-transitory computer-readable medium described herein may further include operations, features, means, or instructions for receiving, from the base station, a threshold for a reception metric of the synchronization signal block and determining to transmit the random access message using the selected random access occasion of the second set of random access occasions based on whether the reception metric of the synchronization signal block satisfies the threshold.

In some examples of the method, apparatuses, and non-transitory computer-readable medium described herein, the reception metric includes a reference signal received power (RSRP) metric or a signal-to-interference-plus-noise (SINR) metric.

Some examples of the method, apparatuses, and non-transitory computer-readable medium described herein may further include operations, features, means, or instructions for receiving, from the base station, a threshold for a transmit power of the UE and determining to transmit the random access message using the selected random access occasion of the second set of random access occasions based on whether the transmit power of the UE satisfies the threshold.

In some examples of the method, apparatuses, and non-transitory computer-readable medium described herein, the threshold includes a maximum permissible exposure (MPE) threshold.

Some examples of the method, apparatuses, and non-transitory computer-readable medium described herein may further include operations, features, means, or instructions for determining that the UE failed to receive a random access response message associated with the transmission of the random access message using the selected random access occasion of the second set of random access occasions and transmitting, based on the failure to receive the random access response message, a second random access message using a second random access occasion of the second set of random access occasions, the second random access occasion associated with a different receive beam of the set of receive beams than the selected random access occasion.

In some examples of the method, apparatuses, and non-transitory computer-readable medium described herein, the selected random access occasion may be associated with a second receive beam that may be narrower than the first receive beam and the method, apparatuses, and non-transitory computer-readable medium may include further operations, features, means, or instructions for receiving, from the base station based on transmitting the random access message, a random access response message associated with the second receive beam.

In some examples of the method, apparatuses, and non-transitory computer-readable medium described herein, the first indication and the second indication may be included in remaining minimum system information associated with the synchronization signal block.

A method for wireless communication at a base station is described. The method may include transmitting a first indication of a first set of random access occasions associated with a synchronization signal block that corresponds with a first receive beam of the base station, transmitting a second indication of a second set of random access occasions that are each associated with a respective receive beam of a set of receive beams of the base station, each receive beam of the set of receive beams spatially overlapping a portion of the first receive beam, and receiving, from a UE and using a second receive beam from the set of receive beams, a random access message using a selected random access occasion of the second set of random access occasions.

An apparatus for wireless communication at a base station is described. The apparatus may include a processor, memory coupled with the processor, and instructions stored in the memory. The instructions may be executable by the processor to cause the apparatus to transmit a first indication of a first set of random access occasions associated with a synchronization signal block that corresponds with a first receive beam of the base station, transmit a second indication of a second set of random access occasions that are each associated with a respective receive beam of a set of receive beams of the base station, each receive beam of the set of receive beams spatially overlapping a portion of the first receive beam, and receive, from a UE and using a second receive beam from the set of receive beams, a random access message using a selected random access occasion of the second set of random access occasions.

Another apparatus for wireless communication at a base station is described. The apparatus may include means for transmitting a first indication of a first set of random access occasions associated with a synchronization signal block that corresponds with a first receive beam of the base station, means for transmitting a second indication of a second set of random access occasions that are each associated with a respective receive beam of a set of receive beams of the base station, each receive beam of the set of receive beams spatially overlapping a portion of the first receive beam, and means for receiving, from a UE and using a second receive beam from the set of receive beams, a random access message using a selected random access occasion of the second set of random access occasions.

A non-transitory computer-readable medium storing code for wireless communication at a base station is described. The code may include instructions executable by a processor to transmit a first indication of a first set of random access occasions associated with a synchronization signal block that corresponds with a first receive beam of the base station, transmit a second indication of a second set of random access occasions that are each associated with a respective receive beam of a set of receive beams of the base station, each receive beam of the set of receive beams spatially overlapping a portion of the first receive beam, and receive, from a UE and using a second receive beam from the set of receive beams, a random access message using a selected random access occasion of the second set of random access occasions.

In some examples of the method, apparatuses, and non-transitory computer-readable medium described herein, receiving the random access message may include operations, features, means, or instructions for receiving the random access message as an initial random access message of a two-step random access procedure or a four-step random access procedure.

Some examples of the method, apparatuses, and non-transitory computer-readable medium described herein may further include operations, features, means, or instructions for monitoring for the random access message using a second random access occasion that precedes the selected random access occasion, the monitoring using a third receive beam from the set of receive beams that may be associated with the second random access occasion, determining that the base station may have failed to receive the random access message using the second random access occasion, and monitoring for the random access message using the selected random access occasion using the second receive beam based on failing to receive the random access message using the second random access occasion.

Some examples of the method, apparatuses, and non-transitory computer-readable medium described herein may further include operations, features, means, or instructions for transmitting a threshold for the UE to use as a basis for transmitting using the second set of random access occasions.

In some examples of the method, apparatuses, and non-transitory computer-readable medium described herein, the threshold may be for a reception metric of the synchronization signal block.

In some examples of the method, apparatuses, and non-transitory computer-readable medium described herein, the reception metric includes an RSRP metric or an SINR metric.

In some examples of the method, apparatuses, and non-transitory computer-readable medium described herein, the threshold may be for a transmit power of the UE.

In some examples of the method, apparatuses, and non-transitory computer-readable medium described herein, the threshold includes an MPE threshold.

Some examples of the method, apparatuses, and non-transitory computer-readable medium described herein may further include operations, features, means, or instructions for transmitting, based on receiving the random access message, a random access response message to the UE using the second receive beam of the set of receive beams.

Some examples of the method, apparatuses, and non-transitory computer-readable medium described herein may further include operations, features, means, or instructions for transmitting a third indication of a third set of random access occasions associated with a second synchronization signal block that corresponds with a third receive beam of the base station and transmitting a fourth indication of a fourth set of random access occasions that may be each associated with a respective receive beam of a second set of receive beams, each receive beam of the second set of receive beams at least partially overlapping the third receive beam.

In some examples of the method, apparatuses, and non-transitory computer-readable medium described herein, the second set of receive beams includes a different quantity of receive beams than the set of receive beams.

DETAILED DESCRIPTION

In some wireless communications systems, a base station and a user equipment (UE) may engage in a random access procedure so that the UE can connect with the base station. In advance of the random access procedure, the base station may transmit synchronization signal blocks (SSBs) that help the UE synchronize with the base station and remaining minimum system information (RMSI) that indicates random access occasions associated with the SSBs. The random access occasions may be time and frequency resources that the base station monitors for an initial random access message from the UE. The base station may monitor the random access occasions for an initial random access message using a receive beam that corresponds to the transmit beam of an SSB and that is relatively wide. The coverage (e.g., ability to detect signaling) of a receive beam may be inversely related to the width of the receive beam, so monitoring for a random access message using a wide receive beam may limit the ability of the base station to receive the initial random access message. The ability of a base station (or UE) to receive random access messages may be referred to as random access coverage.

According to the techniques described herein, a base station may improve (e.g., increase) random access coverage by using narrow receive beams to monitor for random access messages associated with an SSB. The narrow receive beams may spatially overlap the wide receive beam corresponding to the transmit beam of the SSB and may be associated with respective random access occasions (referred to as enhanced coverage (EC) random access occasions) that are indicated in the RMSI for the SSB. A UE that receives the SSB may transmit initial random access messages using the EC random access occasions until the base station responds with a random access response (RAR) message. In some examples, the base station may transmit the random access response message using a narrow transmit beam that corresponds to the narrow receive beam that was used to receive the initial random access message from the UE.

Aspects of the disclosure are initially described in the context of a wireless communications system. Aspects of the disclosure are further described in the context of an additional wireless communications system and a process flow. Aspects of the disclosure are further illustrated by and described with reference to apparatus diagrams, system diagrams, and flowcharts that relate to increasing random access coverage.

Figure 1:
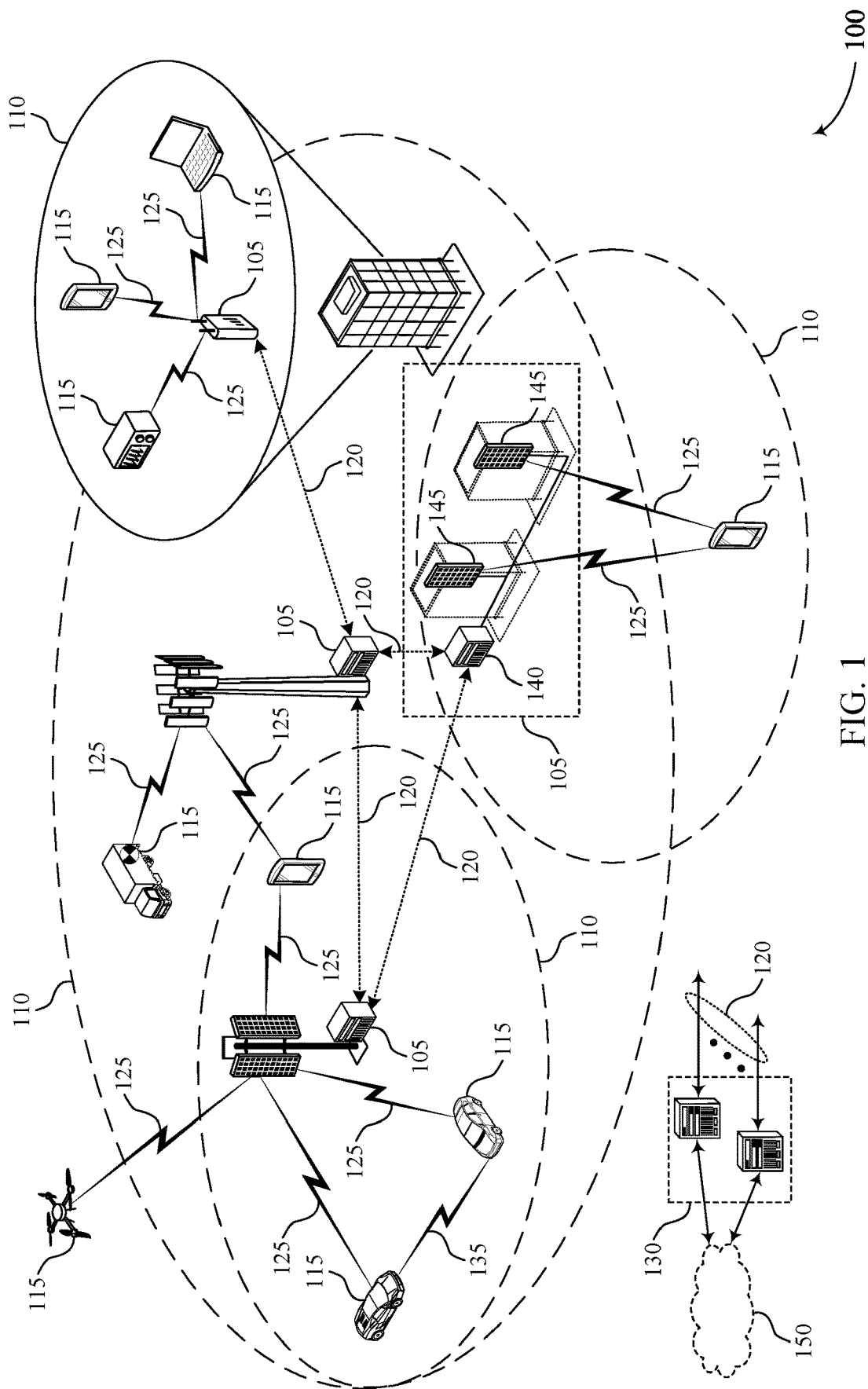
FIG. 1 illustrates an example of a wireless communications system that supports increasing random access coverage in accordance with aspects of the present disclosure.

FIG. 1 illustrates an example of a wireless communications system 100 that supports increasing random access coverage in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body. In some examples, the frequency spectrum of the wireless communications system 100 may be divided into various frequency ranges such as FR2, which may cover 24.4 GHz to 52.6 GHz, FR4, which may cover 52.6 GHz to 71 GHz, and FR5, which may cover 95 GHz to 325 GHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, a base station 105 and a UE 115 may engage in a random access procedure (e.g., a two-step random access procedure or a four-step random access procedure) so that the UE 115 can establish a connection with the base station 105. In advance of the random access procedure, the base station 105 may transmit SSBs using respective (e.g., corresponding) transmit beams. The transmit beams may be relatively wide to reduce the quantity of transmit beams used, which may help the base station 105 conserve power, among other advantages. The base station 105 may also transmit RMSI, which may indicate the random access occasions associated with each SSB. As noted, a random access occasion may refer to time and frequency resources over which the UE 115 is permitted to transmit an initial random access message (e.g., Msg1 in a four-step random access procedure, MsgA in a two-step random access procedure).

Upon receipt of an SSB, a UE 115 may select an appropriate transmit beam and transmit an initial random access message to the base station 105 using a random access occasion for that SSB. However, the base station 105 may not receive the initial random access message because the coverage of the receive beam for the SSB—which may have the same spatial filter as the transmit beam for the SSB—may be limited (e.g., due to the width of the receive beam or for some other reason). Failure to receive the initial random access message may increase power consumption at the UE 115 (e.g., by causing the UE 115 to re-transmit the initial random access message) and may ultimately result in failure of the random access procedure, among other drawbacks. The described drawback may be exacerbated at high frequencies (e.g., FR2, FR4, FR5).

According to the techniques described herein, a base station 105 that transmits an SSB using a wide transmit beam may use narrow receive beams to receive an initial random access message from a UE 115 that receives the SSB. The narrow receive beams may partially overlap the wide receive beam corresponding to the wide transmit beam and may be associated with respective sets of EC random access occasions. Use of the narrow receive beams may allow the base station 105 to detect signals, such as an initial random access message, that would otherwise be undetectable using the wide receive beam. Thus, a base station 105 may increase coverage for a random access procedure. In some examples, a random access procedure may also be referred to as a random access channel (RACH) procedure (as one or more of the messages described herein may be conveyed via the RACH).

Although described with reference to an initial random access message, the techniques described herein may be implemented for any random access message.

Figure 2A:
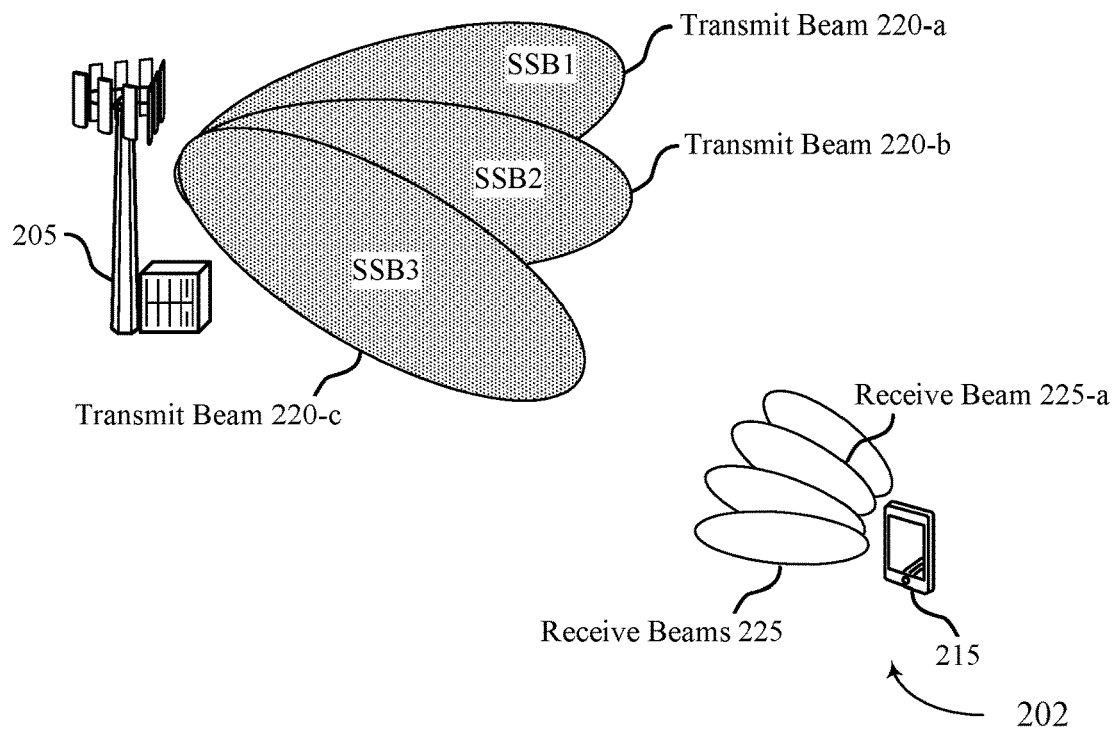
FIGS. 2A and 2B illustrate examples of a wireless communications system that supports increasing random access coverage in accordance with aspects of the present disclosure.
Figure 2B:
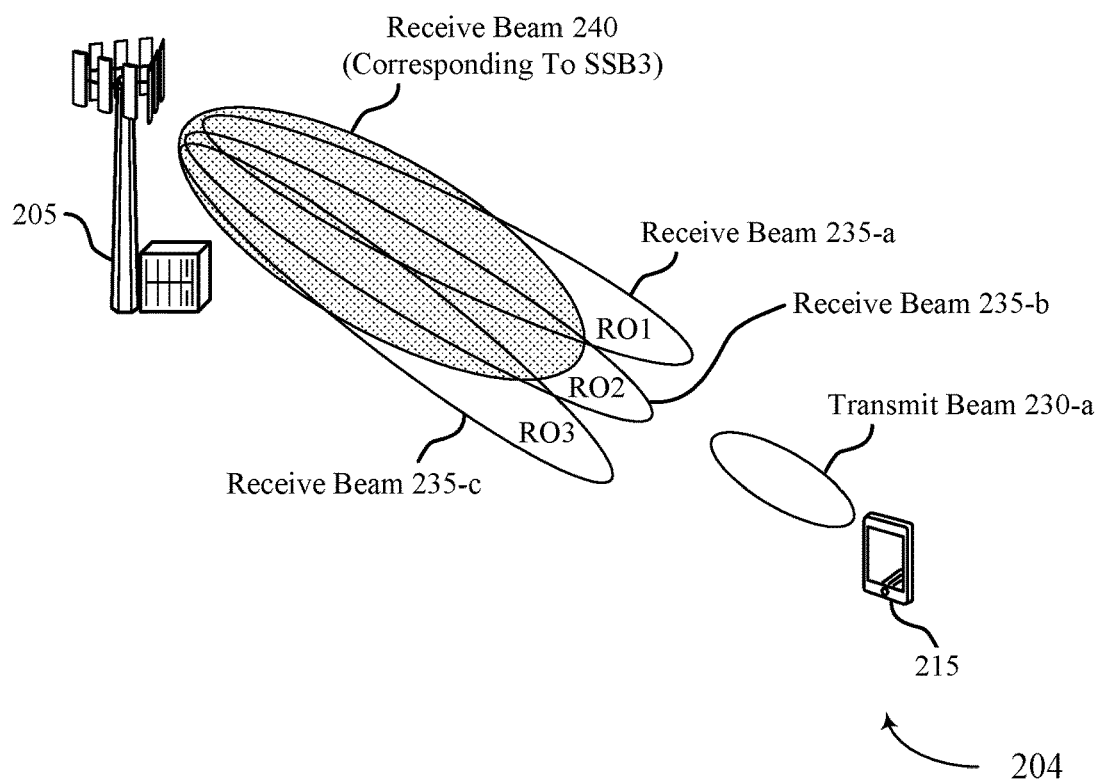

FIGS. 2A and 2B illustrate examples of a wireless communications system 202 and wireless communications system 204, respectively, that each support increasing random access coverage in accordance with aspects of the present disclosure. In some examples, the wireless communications system 202 and wireless communications system 204 may implement aspects of the wireless communications system 100. For example, the wireless communications system 202 and the wireless communications system 204 may each include a base station 205 and a UE 215, which may be examples of a base station 105 and a UE 115 as described with reference to FIG. 1. FIG. 2A may illustrate aspects of the wireless communications system 202 that are associated with SSB signaling, and FIG. 2B may illustrate aspects of the wireless communications system 204 that are associated with initial random access message signaling. As shown in FIG. 2B, the base station 205 may use narrow receive beams to monitor for an initial random access message from the UE 215, which may improve the coverage of the base station 205 for a random access procedure.

Referring to FIG. 2A, the base station 205 may transmit SSBs in advance of a random access procedure. For example, the base station 205 may transmit SSB1, SSB2, and SSB3. Other quantities are SSBs are contemplated. The SSBs may convey synchronization signals, such as primary synchronization signals (PSS) and secondary synchronization signals (SSS), for synchronizing with the base station 205. The SSBs may also convey one or more physical channels, such as the physical broadcast channel (PBCH). The PBCH may include a master information block (MIB) that carries system information and that may allow UEs to locate and decode one or more secondary information blocks (SIBs), such as SIB1. SIB1 may also be referred to as RMSI and may indicate random access occasions for the SSB(s) associated with SIB1.

The base station 205 may transmit each SSB using a corresponding transmit beam 220. For example, the base station 205 may transmit SSB1 using transmit beam 220-a, may transmit SSB2 using transmit beam 220-b, and may transmit SSB3 using transmit beam 220-c. The transmit beams 220 may partially overlap but may be directed in different directions to increase the likelihood that UE 215 (among other UEs) receives an SSB. Similarly, UE 215 may activate multiple receive beams 225 to increase the likelihood that UE 215 receives an SSB and to determine which receive beam 225 provides robust reception (e.g., is associated with reception metrics that satisfy various thresholds). In the given example, UE 215 may determine that receive beam 225-a provides more robust reception than the other receive beams 225-a. For example, UE 215 may determine that, relative to the other receive beams 225, receive beam 225-a has a higher signal-to-noise-plus-interference (SINR), a higher reference signal strength indicator (RSSI), or other metric associated with reception.

In addition to SSBs, the base station 205 may transmit RMSI (which may also be referred to as SIB1) that indicates random access occasions associated with the SSBs. For example, the RMSI for SSB1 may indicate random access occasions for SSB1, the RMSI for SSB2 may indicate random access occasions for SSB2, and the RMSI for SSB3 may indicate random access occasions for SSB3. Thus, the UE 215 may use the RMSI to determine the random access occasions for SSB3, which may be associated with the receive beam 240. Random access occasions associated with the receive beam 240 (or other wide receive beams) may be referred to herein as non-EC random access occasions.

The RMSI may also indicate EC random access occasions associated with the SSBs, which may enable use of narrow receive beams at the base station 205. For example, the RMSI for SSB1 may indicate EC random access occasions associated with SSB1, the RMSI for SSB2 may indicate EC random access occasions associated with SSB2, and the RMSI for SSB3 may indicate EC random access occasions associated with SSB3. The EC random access occasions may be associated with respective narrow receive beams of the base station 205. For example, of the EC random access occasions RO1, RO2, and RO3, which may be associated with SSB3, RO1 may be associated with receive beam 235-a, RO2 may be associated with receive beam 235-b, and RO3 may be associated with receive beam 235-c. The receive beams 235 may at least partially overlap the receive beam 240, and some of the receive beams 235 may at least partially overlap with each other (e.g., in the spatial domain). Alternatively, the receive beams 235 may be non-overlapping with respect to each other. Although shown with a single associated EC random access occasion, each receive beam 235 may be associated with multiple sets (e.g., instances) of EC random access occasions.

Reference is now made to FIG. 2B. After receiving SSB3 and the RMSI, the UE 215 may transmit an initial random access message to the base station 205. The UE 215 may transmit the initial random access message using transmit beam 230-a, which may correspond to (e.g., have the same or a similar spatial filter as) the receive beam 225-a.

The UE 215 may transmit the initial random access message using EC random access occasions associated with SSB3 until a RAR message is received from the base station 205. For example, the UE 215 may transmit the initial random access message using RO1. If the UE 215 does not receive a RAR message within a threshold amount of time relative to transmission of the initial random access message, the UE 215 may re-transmit the initial random access message using RO2. And so on and so forth until the UE 215 receives a RAR message from the base station 205. The UE 215 may select the use-order of the EC random access occasions randomly, based on information from the base station 205, and/or based on a pre-configuration of the UE 215.

The base station 205 may activate the receive beams 235 in an attempt to receive the initial random access message from the UE 215. For example, the base station 205 may activate receive beam 235-a in an attempt to receive the initial random access using RO1, may activate receive beam 235-b in an attempt to receive the initial random access using RO2, and may activate receive beam 235-c in an attempt to receive the initial random access using RO3. A receive beam 235 may be activated discontinuously (e.g., based on the timing of corresponding EC random access occasions) or continuously. Thus, the base station 205 may activate the receive beams 235 at different times, at partially overlapping times, or at the same time.

As noted, the receive beams 235 may overlap (e.g., spatially) the receive beam 240, which may correspond to the transmit beam 220-c use to transmit SSB3. The receive beams 235 may overlap the receive beam 240 to provide a similar reception pattern as the receive beam 240 and may provide increased coverage due to narrower beam widths. Although shown relative to a single receive beam 240 for ease of illustration, the techniques described herein may be extended to other receive beams that correspond to the transmit beams 220.

In some examples, the UE 215 may transmit the initial random access message using the EC random access occasions after failing to receive a RAR message in response to one or more initial random access messages transmitted using the non-EC random access occasions. For example, the UE 215 may first transmit the initial random access message using one or more non-EC random access occasions. But the UE 215 may not receive a RAR message in response to the initial random access message (e.g., because the base station 205 failed to receive the initial random access message). In such a scenario, the UE 215 may stop using the non-EC random access occasions to transmit initial random access message and instead use the EC random access occasions (which may increase the likelihood of reception at the base station 205). Thus, the UE 215 may attempt to initiate the random access procedure using the non-EC random access occasions so that the base station 305 can conserve power by receiving the initial random access message using the receive beam 240, which may consume less power than the receive beams 235.

In some examples, the UE 215 may transmit the initial random access message using the EC random access occasions without first transmitting the initial random access message using the random access occasions associated with the receive beam 240 (e.g., the UE 215 may refrain from using the random access occasions associated with the receive beam 240). For example, the UE 215 may determine that the UE 215 is in a coverage-limited scenario that warrants use of the EC random access occasions. For instance, the UE 215 may determine that the UE 215 is in a coverage-limited scenario if a reception metric (e.g., RSSI, SINR) associated with SSB3 fails to satisfy a threshold value. The threshold value for the reception metric may be indicated to the UE 215 by the base station 205 (e.g., via the RMSI or some other signaling). As another example, the UE 215 may determine that the UE 215 is in a coverage-limited scenario if the transmission power of the UE 215 is limited below a threshold value. For instance, the UE 215 may be subject to a maximum permitted exposure (MPE) parameter, which may limit the transmission power of the UE 215. The threshold value for the transmission power may be indicated to the UE 215 by the base station 205 (e.g., via the RMSI or some other signaling).

Thus, the base station 205 and the UE 215 may operate in manners that permit the base station 205 to use narrow receives beams, such as the receive beams 235, using a random access procedure. Although three receive beams 235 are shown, the receive beam 240 (and thus SSB3) may be associated with any quantity of receive beams 235. Further, different receive beams (e.g., associated with different SSBs) may have the same or different quantities of receive beams 235.

Figure 3:
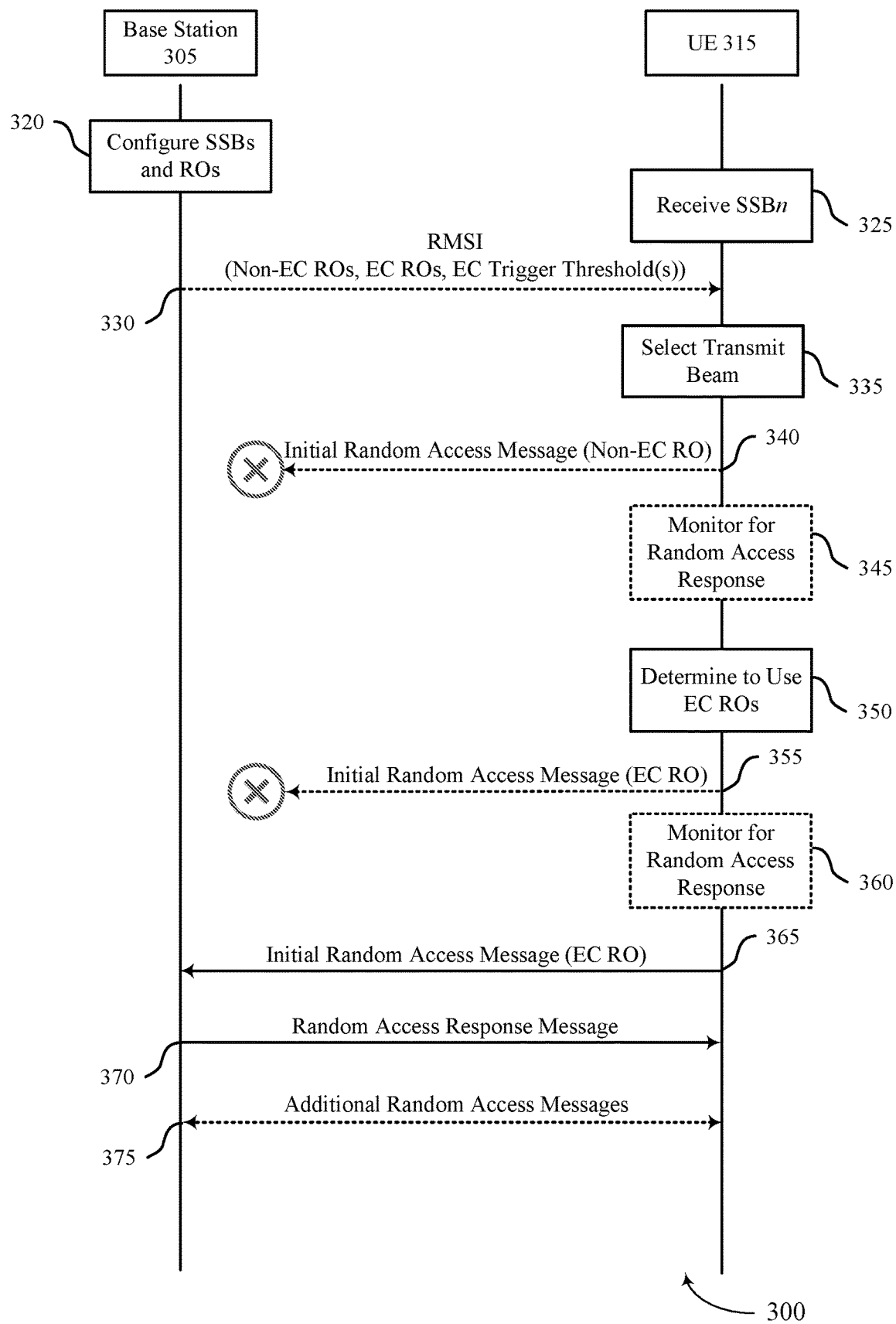
FIG. 3 illustrates an example of a process flow that supports increasing random access coverage in accordance with aspects of the present disclosure.

FIG. 3 illustrates an example of a process flow 300 that supports increasing random access coverage in accordance with aspects of the present disclosure. In some examples, the process flow 300 may be related to aspects of the wireless communications system 100, the wireless communications system 202, or the wireless communications system 204. For example, the process flow 300 may be implemented by a base station 305 and a UE 315, which may be examples of a base station or a UE as described herein. The process flow 300 may allow the base station 305 to improve coverage for a random access procedure by using narrow receive beams.

At 320, the base station 305 may configure SSBs and random access occasions for the SSBs. For example, the base station 305 may configure various aspects and parameters for the SSBs, including corresponding transmit beams, and may configure random access occasions for the SSBs. The base station 305 may also configure EC random access occasions for one or more of the SSBs. As noted, the quantity of EC random access occasions configured for different SSBs may be the same or different. After configuring the SSBs, the base station 320 may transmit the SSBs according to the configuration and using respective transmit beams. For example, the base station 305 may transmit SSBn using corresponding transmit beam n.

At 325, the UE 315 may receive SSBn from the base station 305. The UE 315 may receive SSBn as part of a cell search procedure performed by the UE 315 to identify a suitable cell for connection. The UE 315 may determine synchronization information for base station 305 based on SSBn and may also receive PBCH. At 330, the base station 305 may transmit, and the UE 315 may receive, RMSI that is associated with at least SSBn. The RMSI may indicate random access occasions associated with SSBn and EC random access occasions (EC ROs) associated with SSBn. So, the UE 315 may determine a first set of random access occasions associated with SSBn and a second set of random access occasions associated with SSBn. The RMSI may also indicate one or more thresholds for triggering use of the EC random access occasions (referred to as EC trigger thresholds). For example, the RMSI may indicate a reception metric threshold, a transmit power threshold, or both, among other thresholds. One or more of the parameters indicated by the RMSI may alternatively be indicated by other signaling.

At 335, the UE 315 may select a transmit beam for transmitting an initial random access response message. An initial random access message may be a message transmitted by the UE 315 to initiate the random access procedure. For example, the initial random access message may be MsgA in a two-step random access procedure and may be Msg1 in a four-step random access procedure. Thus, the initial random access message may include a random access preamble, which may also be referred to as a RACH preamble, among other information. The UE 315 may select the transmit beam for the initial random access message based on one or more reception metrics associated with SSBn. In some examples, the UE 315 may select the transmit beam that corresponds to the receive beam with reception metrics for SSBn that satisfy one or more thresholds.

In some examples, the UE 315 may, at 340, transmit the initial random access message using a non-EC random access occasion associated with SSBn. However, the base station 305 may not receive the initial random access message. In other examples, the UE 315 may skip the operations at 340. If the UE 315 does perform the operations at 340, the UE 315 may, at 345, monitor for a RAR message from the base station 305. The UE 315 may monitor for a RAR message for a threshold amount of time relative to the transmission at 340. But, the UE 315 may fail to receive a RAR message within the threshold amount of time (e.g., because the base station 305 failed to receive the initial random access message transmitted at 340).

At 350, the UE 315 may determine to use the EC random access occasions for transmitting the initial random access message. In some examples, the UE 315 may determine to use the EC random access occasions based on determining that the UE 315 failed to receive a RAR message at 345. In some examples, the UE 315 may determine to use the EC random access occasions based on determining that the UE 315 is in a coverage-limited scenario. For example, the UE 315 may determine that a reception metric (e.g., RSSI, SINR) associated with SSBn fails to satisfy the reception metric threshold indicated at 330. Additionally or alternatively, the UE 315 may determine that a transmit power of the UE 315 is less than a transmit power threshold indicated at 330.

At 355, the UE 315 may transmit the initial random access message using a first EC random access occasion associated with SSBn. Thus, the UE 315 may select the first EC random access occasion. The first EC random access occasion may be associated with a first receive beam (of the base station 305) that is narrower than (and that at least partially overlaps) a receive beam corresponding to the transmit beam for SSBn. The base station 305 may use the first receive beam to monitor for the initial random access using the first EC random access occasion. However, for various reasons, the base station 305 may fail to receive the initial random access message transmitted at 355.

At 360, the UE 315 may monitor for a RAR message from the base station 305. The UE 315 may monitor for a RAR message for a threshold amount of time relative to the transmission at 355. But, the UE 315 may fail to receive a RAR message within the threshold amount of time (e.g., because the base station 305 failed to receive the initial random access message transmitted at 355).

At 365, the UE 315 may transmit the initial random access message using a second EC random access occasion associated with SSBn. Thus, the UE 315 may select the second EC random access occasion. The second EC random access occasion may also be associated with a second receive beam (of the base station 305) that is narrower than (and that at least partially overlaps) a receive beam corresponding to the transmit beam for SSBn. The base station 305 may use the second receive beam to monitor for the initial random access using the second EC random access occasion. The base station 305 may determine to use the second receive beam for monitoring using the second EC random access occasion based on determining that the base station 305 failed to receive the initial random access using the first EC random access occasion. At 365, the base station 305 may receive the initial random access message using the second EC random access occasion using the second receive beam.

At 370, the base station 305 may transmit, and the UE 315 may receive, a RAR message. The base station 305 may transmit the RAR message based at least in part on receiving the initial random access message at 365. A RAR message may be MsgB in a two-step random access procedure and may be Msg2 in a four-step random access procedure. Thus, the RAR message may include a timing advance indication, an uplink grant, and/or an identifier for the UE 315, among other information. The base station 305 may transmit the RAR message using a transmit beam that corresponds to the second receive beam. So, the transmit beam may be narrower than (and spatially overlap with) the transmit beam used for SSBn, which may increase improve the likelihood of reception at the UE 315. At 375, the base station 305 and the UE 315 may exchange one or more additional messages for the random access procedure. For example, as part of a four-step random access procedure, the UE 315 may transmit Msg3 (e.g., a connection request message) and the base station may transmit Msg4 (e.g., a contention resolution message). Thus, base station 305 and the UE 315 may complete the random access procedure.

Alternative examples of the foregoing may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

Figure 4:
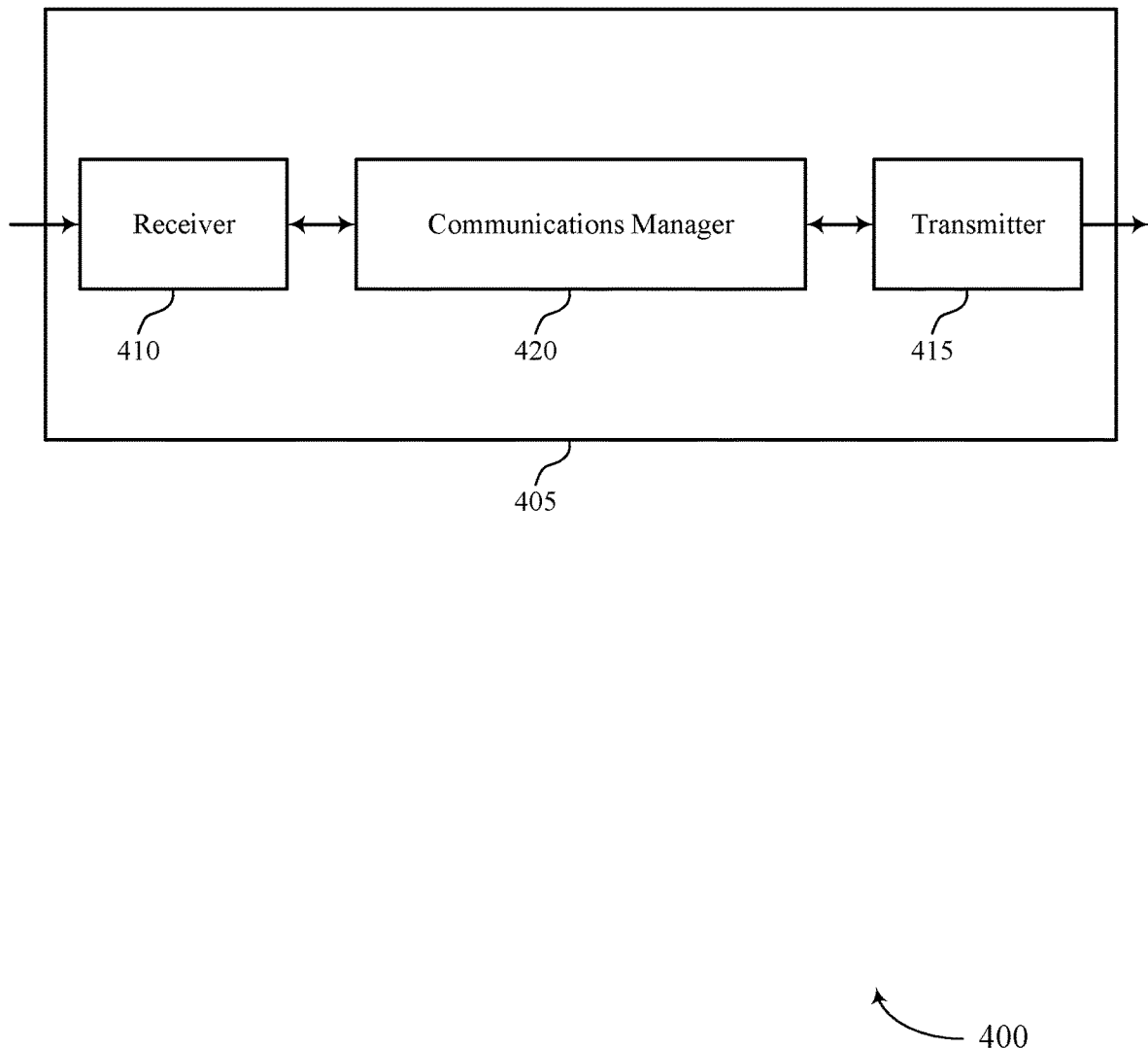
FIGS. 4 and 5 show block diagrams of devices that support increasing random access coverage in accordance with aspects of the present disclosure.

FIG. 4 shows a block diagram 400 of a device 405 that supports increasing random access coverage in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to increasing random access coverage). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to increasing random access coverage). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of increasing random access coverage as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving a first indication of a first set of random access occasions associated with a synchronization signal block that corresponds with a first receive beam of a base station. The communications manager 420 may be configured as or otherwise support a means for receiving a second indication of a second set of random access occasions that are each associated with a respective receive beam of a set of receive beams of the base station, each receive beam of the set of receive beams spatially overlapping a portion of the first receive beam. The communications manager 420 may be configured as or otherwise support a means for transmitting a random access message using a selected random access occasion of the second set of random access occasions.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for improved random access coverage.

Figure 5:
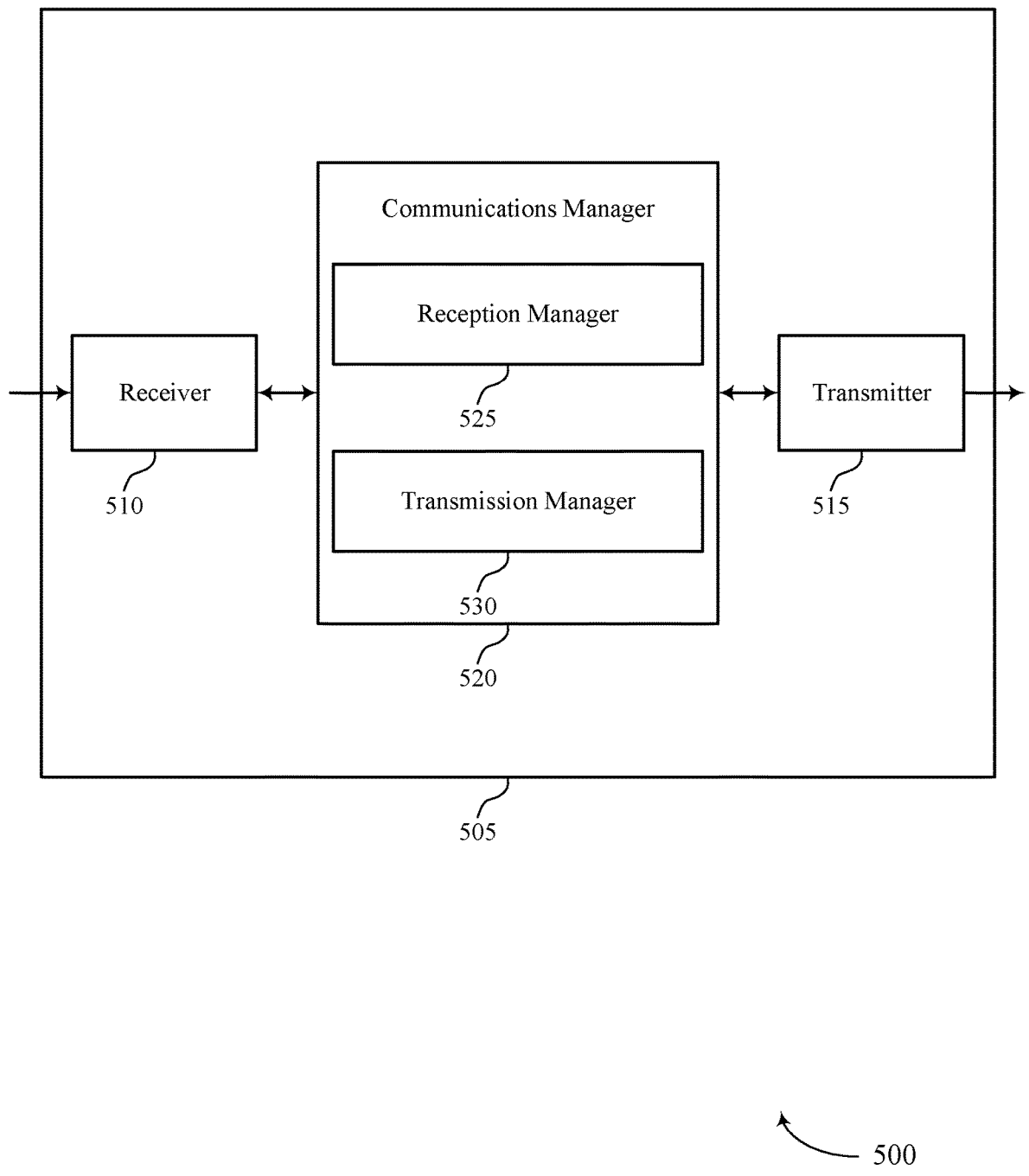

FIG. 5 shows a block diagram 500 of a device 505 that supports increasing random access coverage in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to increasing random access coverage). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to increasing random access coverage). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of increasing random access coverage as described herein. For example, the communications manager 520 may include a reception manager 525 a transmission manager 530, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The reception manager 525 may be configured as or otherwise support a means for receiving a first indication of a first set of random access occasions associated with a synchronization signal block that corresponds with a first receive beam of a base station. The reception manager 525 may be configured as or otherwise support a means for receiving a second indication of a second set of random access occasions that are each associated with a respective receive beam of a set of receive beams of the base station, each receive beam of the set of receive beams spatially overlapping a portion of the first receive beam. The transmission manager 530 may be configured as or otherwise support a means for transmitting a random access message using a selected random access occasion of the second set of random access occasions.

Figure 6:
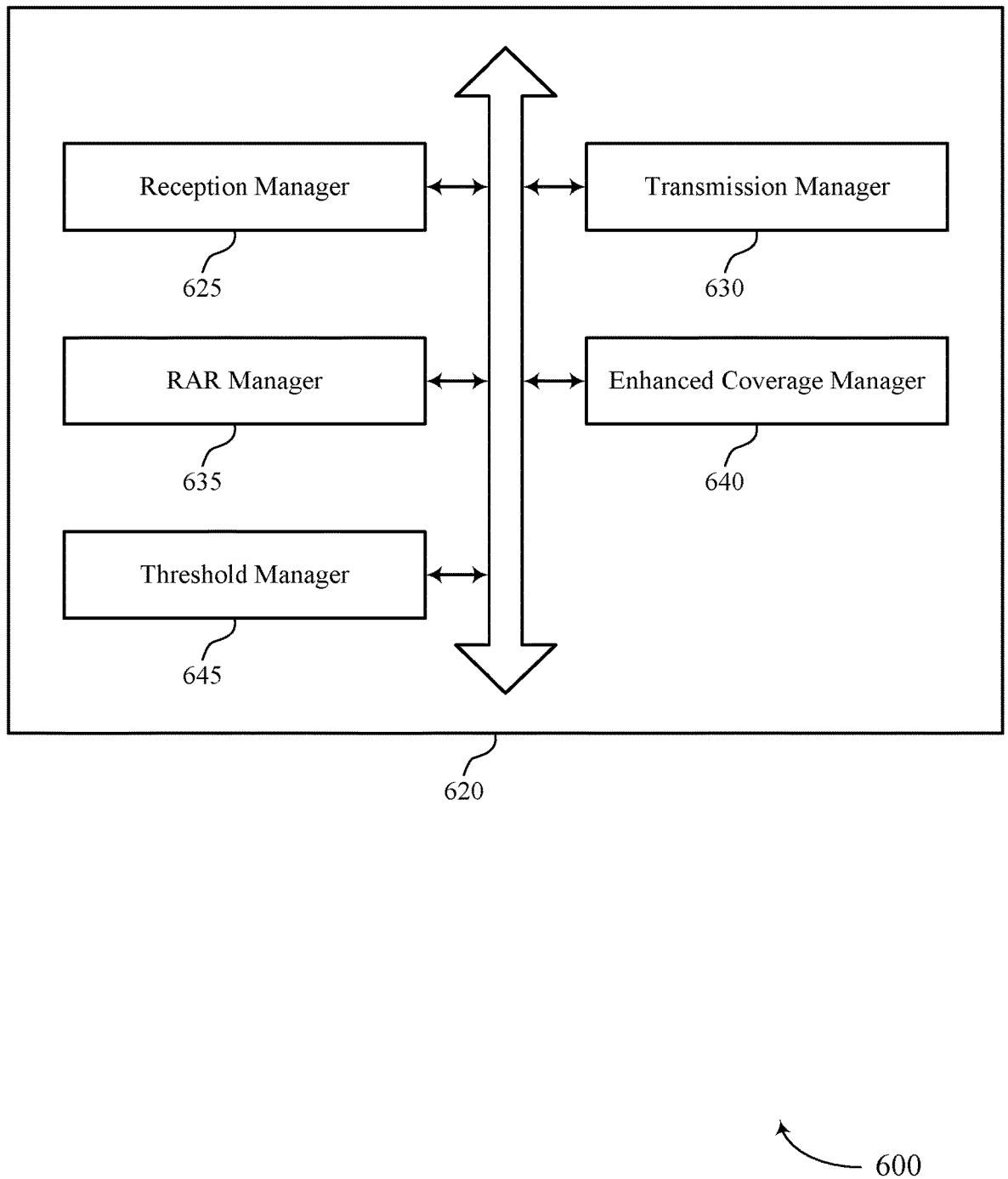
FIG. 6 shows a block diagram of a communications manager that supports increasing random access coverage in accordance with aspects of the present disclosure.

FIG. 6 shows a block diagram 600 of a communications manager 620 that supports increasing random access coverage in accordance with aspects of the present disclosure. The communications manager 620 may be an example of aspects of a communications manager 420, a communications manager 520, or both, as described herein. The communications manager 620, or various components thereof, may be an example of means for performing various aspects of increasing random access coverage as described herein. For example, the communications manager 620 may include a reception manager 625, a transmission manager 630, a RAR manager 635, an enhanced coverage manager 640, a threshold manager 645, or any combination thereof. Each of these components may communicate, directly or indirectly, with one another (e.g., via one or more buses).

The communications manager 620 may support wireless communication at a UE in accordance with examples as disclosed herein. The reception manager 625 may be configured as or otherwise support a means for receiving a first indication of a first set of random access occasions associated with a synchronization signal block that corresponds with a first receive beam of a base station. In some examples, the reception manager 625 may be configured as or otherwise support a means for receiving a second indication of a second set of random access occasions that are each associated with a respective receive beam of a set of receive beams of the base station, each receive beam of the set of receive beams spatially overlapping a portion of the first receive beam. The transmission manager 630 may be configured as or otherwise support a means for transmitting the random access message using a selected random access occasion of the second set of random access occasions.

In some examples, to support transmitting the random access message, the transmission manager 630 may be configured as or otherwise support a means for transmitting the random access message as an initial random access message of a two-step random access procedure or a four-step random access procedure.

In some examples, the transmission manager 630 may be configured as or otherwise support a means for transmitting the random access message using one of the first set of random access occasions. In some examples, the RAR manager 635 may be configured as or otherwise support a means for determining that the UE failed to receive a random access response associated with the transmission of the random access message using the one of the first set of random access occasions. In some examples, the enhanced coverage manager 640 may be configured as or otherwise support a means for determining to transmit a random access message using the selected random access occasion of the second set of random access occasions based on the failure to receive the random access response.

In some examples, the threshold manager 645 may be configured as or otherwise support a means for receiving, from the base station, a threshold for a reception metric of the synchronization signal block. In some examples, the enhanced coverage manager 640 may be configured as or otherwise support a means for determining to transmit the random access message using the selected random access occasion of the second set of random access occasions based on whether the reception metric of the synchronization signal block satisfies the threshold. In some examples, the reception metric includes an RSRP metric or an SINR metric.

In some examples, the threshold manager 645 may be configured as or otherwise support a means for receiving, from the base station, a threshold for a transmit power of the UE. In some examples, the enhanced coverage manager 640 may be configured as or otherwise support a means for determining to transmit the random access message using the selected random access occasion of the second set of random access occasions based on whether the transmit power of the UE satisfies the threshold. In some examples, the threshold includes an MPE threshold.

In some examples, the RAR manager 635 may be configured as or otherwise support a means for determining that the UE failed to receive a random access response message associated with the transmission of the random access message using the selected random access occasion of the second set of random access occasions. In some examples, the transmission manager 630 may be configured as or otherwise support a means for transmitting, based on the failure to receive the random access response message, a second random access message using a second random access occasion of the second set of random access occasions, the second random access occasion associated with a different receive beam of the set of receive beams than the selected random access occasion.

In some examples, the selected random access occasion is associated with a second receive beam that is narrower than the first receive beam, and the reception manager 625 may be configured as or otherwise support a means for receiving, from the base station based on transmitting the random access message, a random access response message associated with the second receive beam.

In some examples, the first indication and the second indication are included in remaining minimum system information associated with the synchronization signal block.

Figure 7:
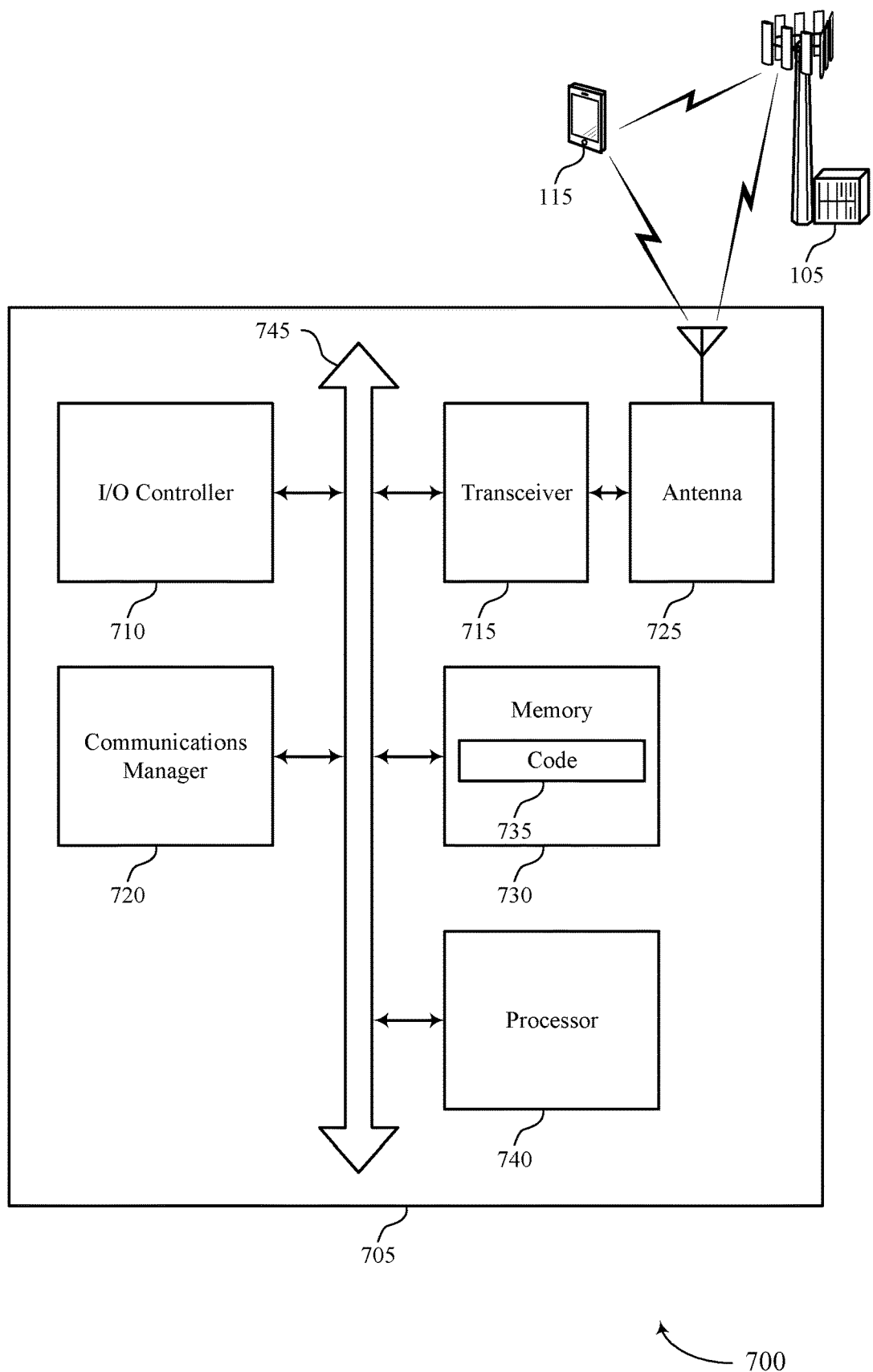
FIG. 7 shows a diagram of a system including a device that supports increasing random access coverage in accordance with aspects of the present disclosure.

FIG. 7 shows a diagram of a system 700 including a device 705 that supports increasing random access coverage in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting increasing random access coverage). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving a first indication of a first set of random access occasions associated with a synchronization signal block that corresponds with a first receive beam of a base station. The communications manager 720 may be configured as or otherwise support a means for receiving a second indication of a second set of random access occasions that are each associated with a respective receive beam of a set of receive beams of the base station, each receive beam of the set of receive beams spatially overlapping a portion of the first receive beam. The communications manager 720 may be configured as or otherwise support a means for transmitting a random access message using a selected random access occasion of the second set of random access occasions.

By including or configuring the communications manager 720 in accordance with examples as described herein, the device 705 may support techniques for improved random access coverage.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of increasing random access coverage as described herein, or the processor 740 and the memory 730 may be otherwise configured to perform or support such operations.

Figure 8:
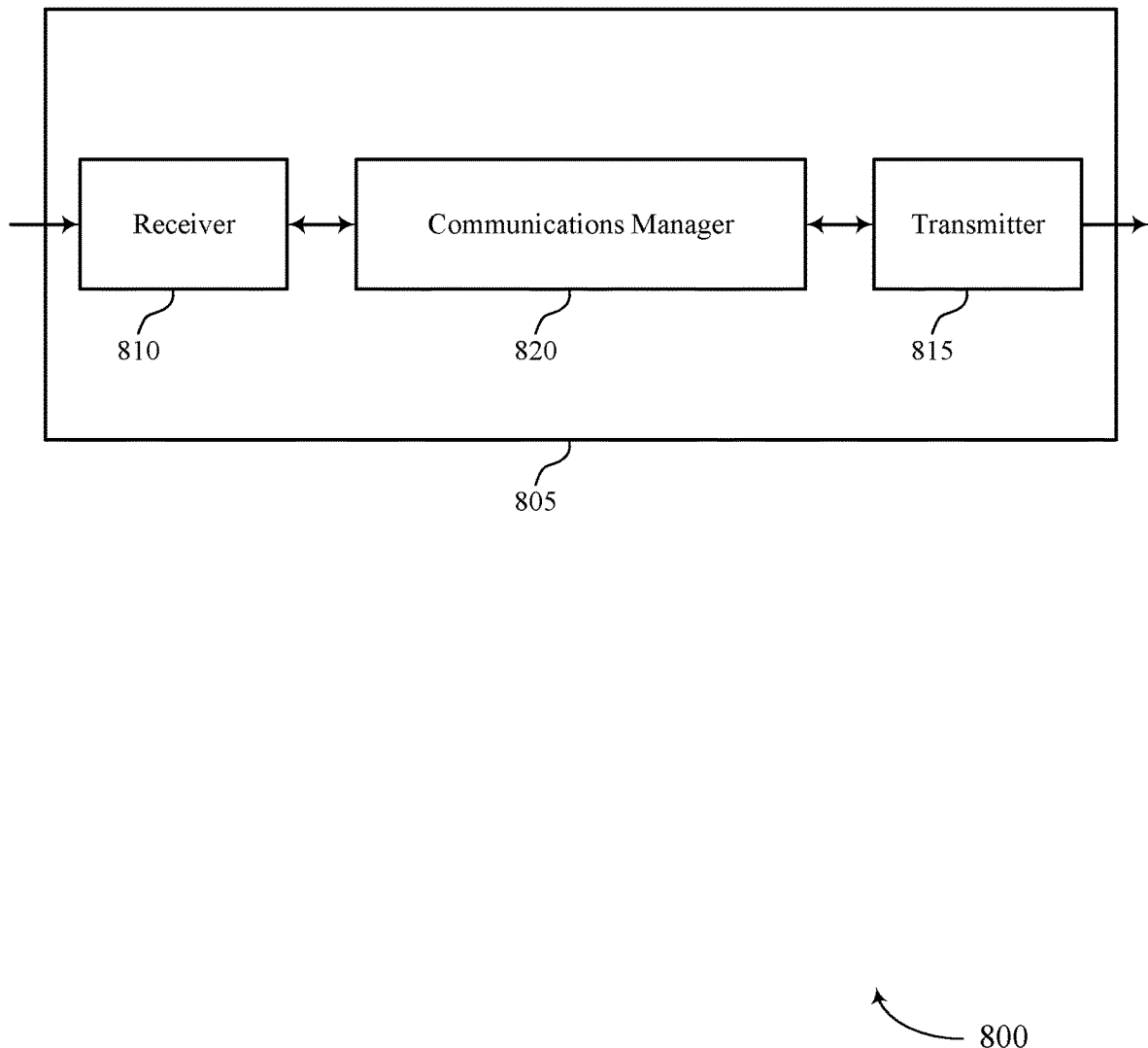
FIGS. 8 and 9 show block diagrams of devices that support increasing random access coverage in accordance with aspects of the present disclosure.

FIG. 8 shows a block diagram 800 of a device 805 that supports increasing random access coverage in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to increasing random access coverage). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to increasing random access coverage). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of increasing random access coverage as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting a first indication of a first set of random access occasions associated with a synchronization signal block that corresponds with a first receive beam of the base station. The communications manager 820 may be configured as or otherwise support a means for transmitting a second indication of a second set of random access occasions that are each associated with a respective receive beam of a set of receive beams of the base station, each receive beam of the set of receive beams spatially overlapping a portion of the first receive beam. The communications manager 820 may be configured as or otherwise support a means for receiving, from a UE and using a second receive beam from the set of receive beams, a random access message using a selected random access occasion of the second set of random access occasions.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for improved random access coverage.

Figure 9:
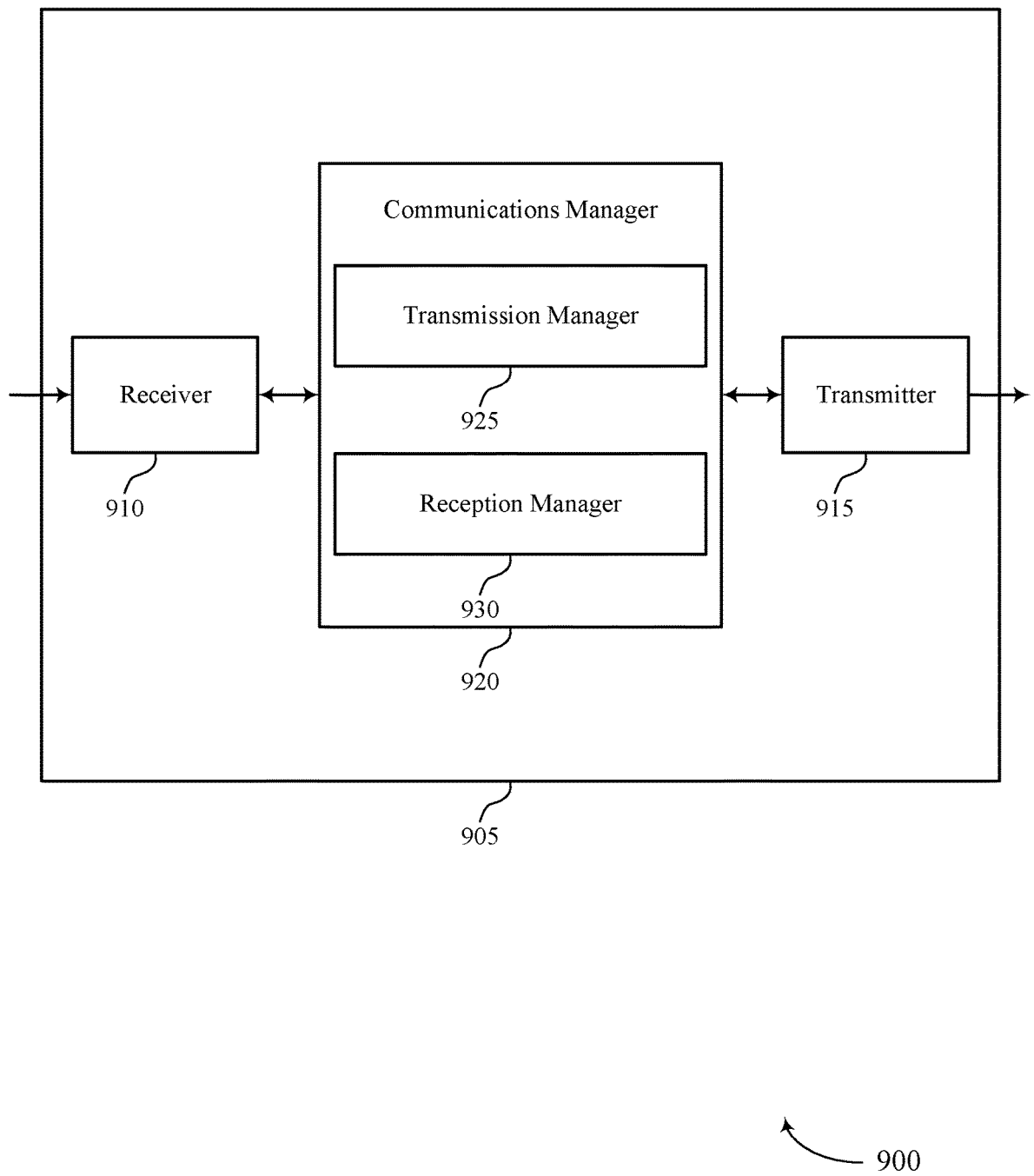

FIG. 9 shows a block diagram 900 of a device 905 that supports increasing random access coverage in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to increasing random access coverage). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to increasing random access coverage). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of increasing random access coverage as described herein. For example, the communications manager 920 may include a transmission manager 925 a reception manager 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The transmission manager 925 may be configured as or otherwise support a means for transmitting a first indication of a first set of random access occasions associated with a synchronization signal block that corresponds with a first receive beam of the base station. The transmission manager 925 may be configured as or otherwise support a means for transmitting a second indication of a second set of random access occasions that are each associated with a respective receive beam of a set of receive beams of the base station, each receive beam of the set of receive beams spatially overlapping a portion of the first receive beam. The reception manager 930 may be configured as or otherwise support a means for receiving, from a UE and using a second receive beam from the set of receive beams, a random access message using a selected random access occasion of the second set of random access occasions.

Figure 10:
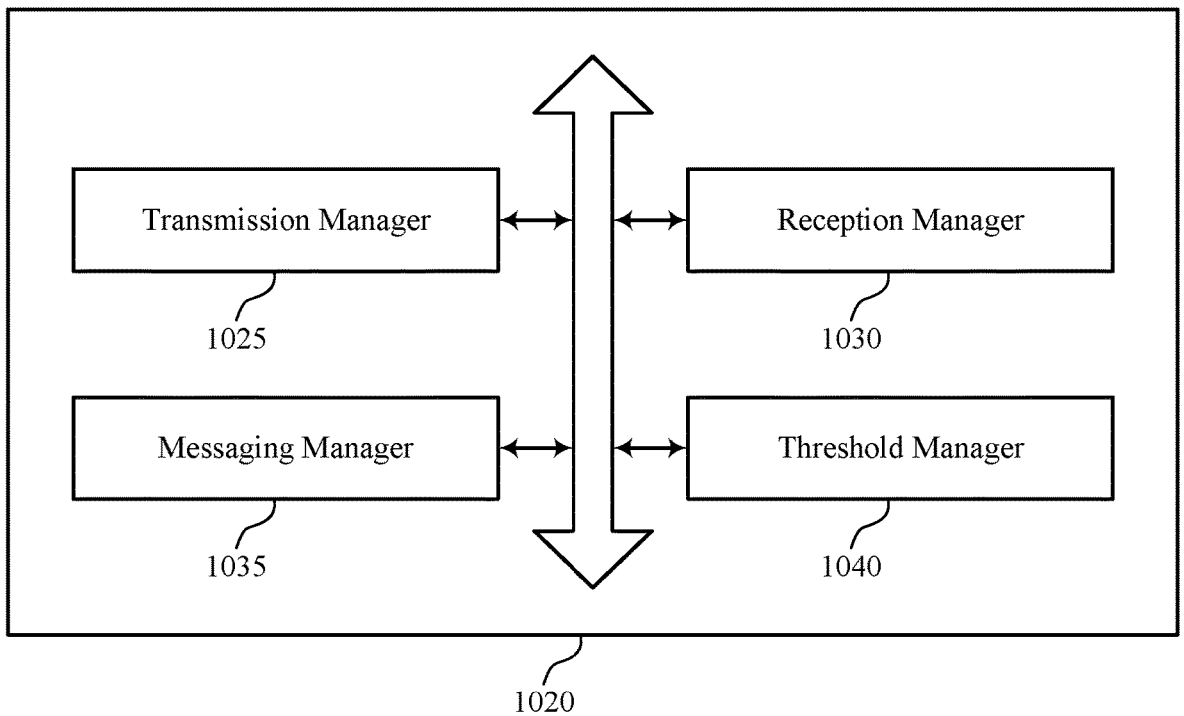
FIG. 10 shows a block diagram of a communications manager that supports increasing random access coverage in accordance with aspects of the present disclosure.

FIG. 10 shows a block diagram 1000 of a communications manager 1020 that supports increasing random access coverage in accordance with aspects of the present disclosure. The communications manager 1020 may be an example of aspects of a communications manager 820, a communications manager 920, or both, as described herein. The communications manager 1020, or various components thereof, may be an example of means for performing various aspects of increasing random access coverage as described herein. For example, the communications manager 1020 may include a transmission manager 1025, a reception manager 1030, a messaging manager 1035, a threshold manager 1040, or any combination thereof. Each of these components may communicate, directly or indirectly, with one another (e.g., via one or more buses).

The communications manager 1020 may support wireless communication at a base station in accordance with examples as disclosed herein. The transmission manager 1025 may be configured as or otherwise support a means for transmitting a first indication of a first set of random access occasions associated with a synchronization signal block that corresponds with a first receive beam of the base station. In some examples, the transmission manager 1025 may be configured as or otherwise support a means for transmitting a second indication of a second set of random access occasions that are each associated with a respective receive beam of a set of receive beams of the base station, each receive beam of the set of receive beams spatially overlapping a portion of the first receive beam. The reception manager 1030 may be configured as or otherwise support a means for receiving, from a UE and using a second receive beam from the set of receive beams, a random access message using a selected random access occasion of the second set of random access occasions.

In some examples, to support receiving the random access message, the reception manager 1030 may be configured as or otherwise support a means for receiving the random access message as an initial random access message of a two-step random access procedure or a four-step random access procedure.

In some examples, the messaging manager 1035 may be configured as or otherwise support a means for monitoring for the random access message using a second random access occasion that precedes the selected random access occasion, the monitoring using a third receive beam from the set of receive beams that is associated with the second random access occasion. In some examples, the messaging manager 1035 may be configured as or otherwise support a means for determining that the base station has failed to receive the random access message using the second random access occasion. In some examples, the messaging manager 1035 may be configured as or otherwise support a means for monitoring for the random access message using the selected random access occasion using the second receive beam based on failing to receive the random access message using the second random access occasion.

In some examples, the threshold manager 1040 may be configured as or otherwise support a means for transmitting a threshold for the UE to use as a basis for transmitting using the second set of random access occasions.

In some examples, the threshold is for a reception metric of the synchronization signal block. In some examples, the reception metric includes an RSRP metric or an SINR metric. In some examples, the threshold is for a transmit power of the UE. In some examples, the threshold includes an MPE threshold.

In some examples, the transmission manager 1025 may be configured as or otherwise support a means for transmitting, based on receiving the random access message, a random access response message to the UE using the second receive beam of the set of receive beams.

In some examples, the transmission manager 1025 may be configured as or otherwise support a means for transmitting a third indication of a third set of random access occasions associated with a second synchronization signal block that corresponds with a third receive beam of the base station. In some examples, the transmission manager 1025 may be configured as or otherwise support a means for transmitting a fourth indication of a fourth set of random access occasions that are each associated with a respective receive beam of a second set of receive beams, each receive beam of the second set of receive beams at least partially overlapping the third receive beam.

In some examples, the second set of receive beams includes a different quantity of receive beams than the set of receive beams.

Figure 11:
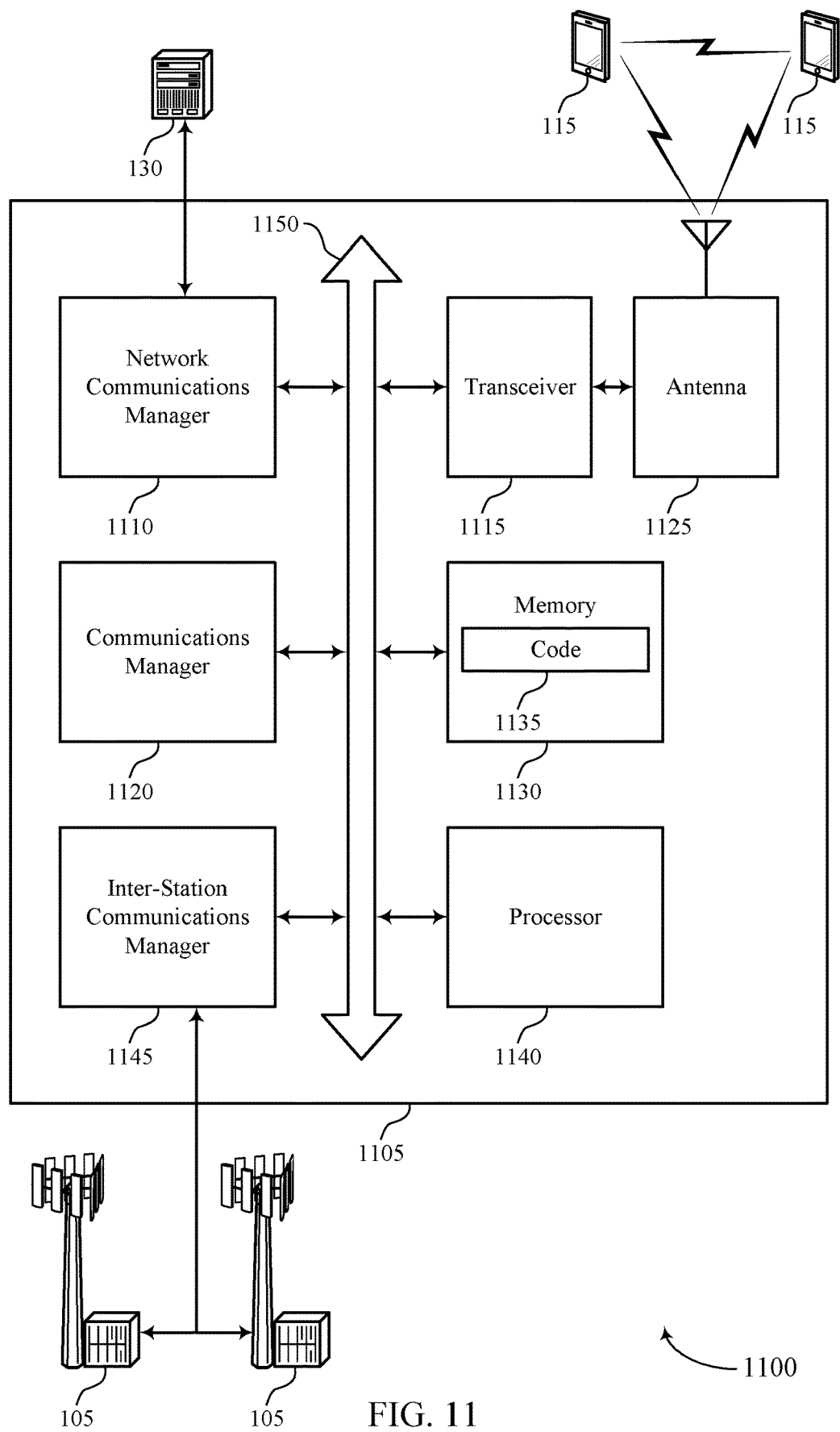
FIG. 11 shows a diagram of a system including a device that supports increasing random access coverage in accordance with aspects of the present disclosure.

FIG. 11 shows a diagram of a system 1100 including a device 1105 that supports increasing random access coverage in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting increasing random access coverage). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting a first indication of a first set of random access occasions associated with a synchronization signal block that corresponds with a first receive beam of the base station. The communications manager 1120 may be configured as or otherwise support a means for transmitting a second indication of a second set of random access occasions that are each associated with a respective receive beam of a set of receive beams of the base station, each receive beam of the set of receive beams spatially overlapping a portion of the first receive beam. The communications manager 1120 may be configured as or otherwise support a means for receiving, from a UE and using a second receive beam from the set of receive beams, a random access message using a selected random access occasion of the second set of random access occasions.

By including or configuring the communications manager 1120 in accordance with examples as described herein, the device 1105 may support techniques for improved random access coverage.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of increasing random access coverage as described herein, or the processor 1140 and the memory 1130 may be otherwise configured to perform or support such operations.

Figure 12:
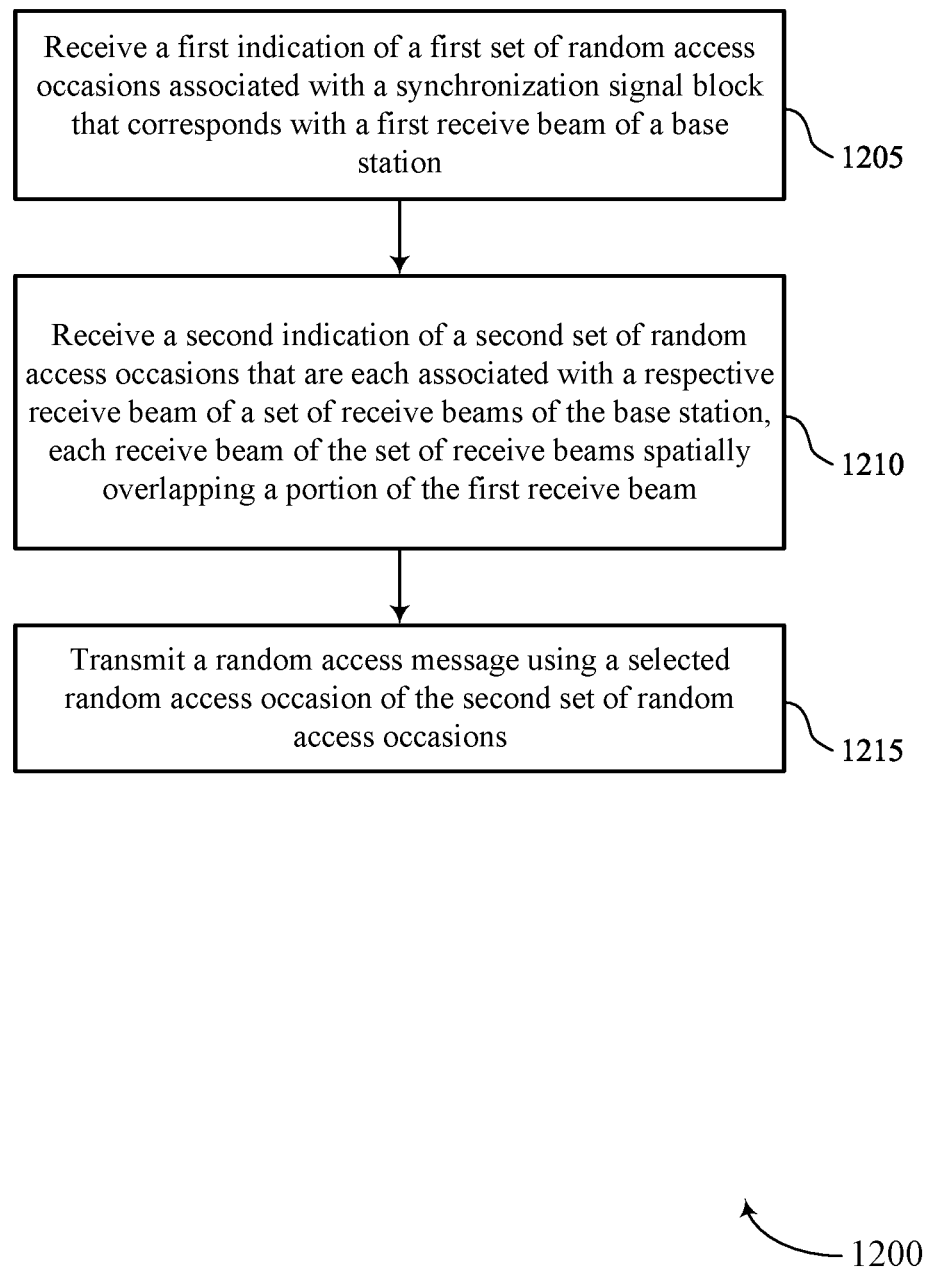
FIGS. 12 and 13 show flowcharts illustrating methods that support increasing random access coverage in accordance with aspects of the present disclosure.

FIG. 12 shows a flowchart illustrating a method 1200 that supports increasing random access coverage in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving a first indication of a first set of random access occasions associated with a synchronization signal block that corresponds with a first receive beam of a base station. The operations of 1205 may be performed in accordance with examples as disclosed herein. In some examples, aspects of the operations of 1205 may be performed by a reception manager 625 as described with reference to FIG. 6.

At 1210, the method may include receiving a second indication of a second set of random access occasions that are each associated with a respective receive beam of a set of receive beams of the base station, each receive beam of the set of receive beams spatially overlapping a portion of the first receive beam. The operations of 1210 may be performed in accordance with examples as disclosed herein. In some examples, aspects of the operations of 1210 may be performed by a reception manager 625 as described with reference to FIG. 6.

At 1215, the method may include transmitting a random access message using a selected random access occasion of the second set of random access occasions. The operations of 1215 may be performed in accordance with examples as disclosed herein. In some examples, aspects of the operations of 1215 may be performed by a transmission manager 630 as described with reference to FIG. 6.

Figure 13:
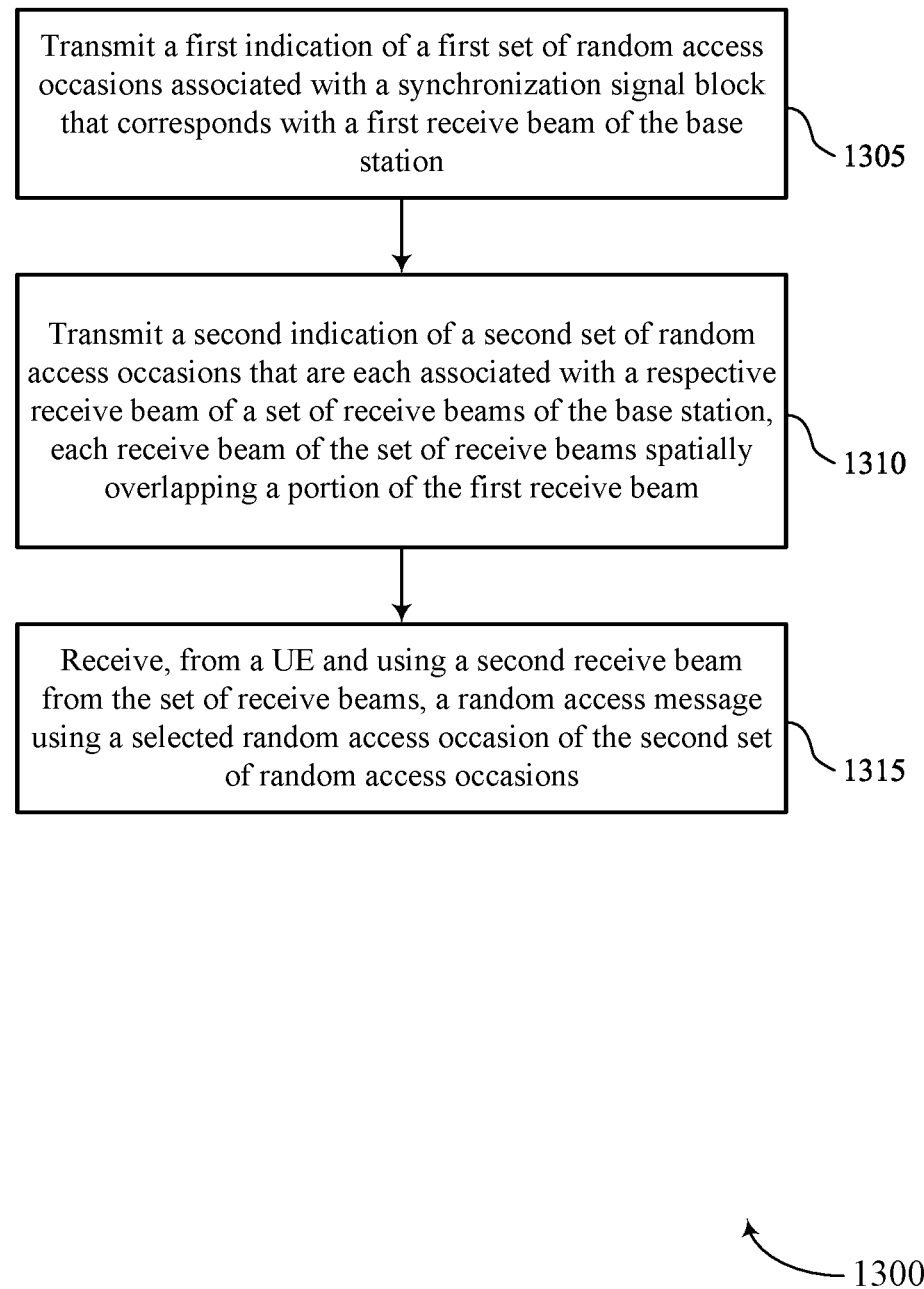

FIG. 13 shows a flowchart illustrating a method 1300 that supports increasing random access coverage in accordance with aspects of the present disclosure. The operations of the method 1300 may be implemented by a base station or its components as described herein. For example, the operations of the method 1300 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1305, the method may include transmitting a first indication of a first set of random access occasions associated with a synchronization signal block that corresponds with a first receive beam of the base station. The operations of 1305 may be performed in accordance with examples as disclosed herein. In some examples, aspects of the operations of 1305 may be performed by a transmission manager 1025 as described with reference to FIG. 10.

At 1310, the method may include transmitting a second indication of a second set of random access occasions that are each associated with a respective receive beam of a set of receive beams of the base station, each receive beam of the set of receive beams spatially overlapping a portion of the first receive beam. The operations of 1310 may be performed in accordance with examples as disclosed herein. In some examples, aspects of the operations of 1310 may be performed by a transmission manager 1025 as described with reference to FIG. 10.

At 1315, the method may include receiving, from a UE and using a second receive beam from the set of receive beams, a random access message using a selected random access occasion of the second set of random access occasions. The operations of 1315 may be performed in accordance with examples as disclosed herein. In some examples, aspects of the operations of 1315 may be performed by a reception manager 1030 as described with reference to FIG. 10.

The following provides an overview of aspects of the present disclosure:

Aspect 1: A method for wireless communication at a UE, comprising: receiving a first indication of a first set of random access occasions associated with a synchronization signal block that corresponds with a first receive beam of a base station; receiving a second indication of a second set of random access occasions that are each associated with a respective receive beam of a set of receive beams of the base station, each receive beam of the set of receive beams spatially overlapping a portion of the first receive beam; and transmitting the random access message using a selected random access occasion of the second set of random access occasions.

Aspect 2: The method of aspect 1, wherein transmitting the random access message comprises: transmitting the random access message as an initial random access message of a two-step random access procedure or a four-step random access procedure.

Aspect 3: The method of any of aspects 1 through 2, further comprising: transmitting the random access message using one of the first set of random access occasions; determining that the UE failed to receive a random access response associated with the transmission of the random access message using the one of the first set of random access occasions; and determining to transmit the random access message using the selected random access occasion of the second set of random access occasions based at least in part on the failure to receive the random access response.

Aspect 4: The method of any of aspects 1 through 3, further comprising: receiving, from the base station, a threshold for a reception metric of the synchronization signal block; and determining to transmit the random access message using the selected random access occasion of the second set of random access occasions based at least in part on whether the reception metric of the synchronization signal block satisfies the threshold.

Aspect 5: The method of aspect 4, wherein the reception metric comprises a reference signal received power (RSRP) metric or a signal-to-interference-plus-noise (SINR) metric.

Aspect 6: The method of any of aspects 1 through 5, further comprising: receiving, from the base station, a threshold for a transmit power of the UE; and determining to transmit the random access message using the selected random access occasion of the second set of random access occasions based at least in part on whether the transmit power of the UE satisfies the threshold.

Aspect 7: The method of aspect 6, wherein the threshold comprises a maximum permissible exposure (MPE) threshold.

Aspect 8: The method of any of aspects 1 through 7, further comprising: determining that the UE failed to receive a random access response message associated with the transmission of the random access message using the selected random access occasion of the second set of random access occasions; and transmitting, based at least in part on the failure to receive the random access response message, a second random access message using a second random access occasion of the second set of random access occasions, the second random access occasion associated with a different receive beam of the set of receive beams than the selected random access occasion.

Aspect 9: The method of any of aspects 1 through 7, wherein the selected random access occasion is associated with a second receive beam that is narrower than the first receive beam, the method further comprising: receiving, from the base station based at least in part on transmitting the random access message, a random access response message associated with the second receive beam.

Aspect 10: The method of any of aspects 1 through 9, wherein the first indication and the second indication are included in remaining minimum system information associated with the synchronization signal block.

Aspect 11: A method for wireless communication at a base station, comprising: transmitting a first indication of a first set of random access occasions associated with a synchronization signal block that corresponds with a first receive beam of the base station; transmitting a second indication of a second set of random access occasions that are each associated with a respective receive beam of a set of receive beams of the base station, each receive beam of the set of receive beams spatially overlapping a portion of the first receive beam; and receiving, from a UE and using a second receive beam from the set of receive beams, a random access message using a selected random access occasion of the second set of random access occasions.

Aspect 12: The method of aspect 11, wherein receiving the random access message comprises: receiving the random access message as an initial random access message of a two-step random access procedure or a four-step random access procedure.

Aspect 13: The method of any of aspects 11 through 12, further comprising: monitoring for the random access message using a second random access occasion that precedes the selected random access occasion, the monitoring using a third receive beam from the set of receive beams that is associated with the second random access occasion determining that the base station has failed to receive the random access message using the second random access occasion; and monitoring for the random access message using the selected random access occasion using the second receive beam based at least in part on failing to receive the random access message using the second random access occasion.

Aspect 14: The method of any of aspects 11 through 13, further comprising: transmitting a threshold for the UE to use as a basis for transmitting using the second set of random access occasions.

Aspect 15: The method of aspect 14, wherein the threshold is for a reception metric of the synchronization signal block.

Aspect 16: The method of aspect 15, wherein the reception metric comprises a reference signal received power (RSRP) metric or a signal-to-interference-plus-noise (SINR) metric.

Aspect 17: The method of any of aspects 14 through 16, wherein the threshold is for a transmit power of the UE.

Aspect 18: The method of aspect 17, wherein the threshold comprises a maximum permissible exposure (MPE) threshold.

Aspect 19: The method of any of aspects 11 through 18, further comprising: transmitting, based at least in part on receiving the random access message, a random access response message to the UE using the second receive beam of the set of receive beams.

Aspect 20: The method of any of aspects 11 through 19, further comprising: transmitting a third indication of a third set of random access occasions associated with a second synchronization signal block that corresponds with a third receive beam of the base station; transmitting a fourth indication of a fourth set of random access occasions that are each associated with a respective receive beam of a second set of receive beams, each receive beam of the second set of receive beams at least partially overlapping the third receive beam.

Aspect 21: The method of aspect 20, wherein the second set of receive beams comprises a different quantity of receive beams than the set of receive beams.

Aspect 22: An apparatus for wireless communication at a UE, comprising a processor; memory coupled with the processor; and instructions stored in the memory and executable by the processor to cause the apparatus to perform a method of any of aspects 1 through 10.

Aspect 23: An apparatus for wireless communication at a UE, comprising at least one means for performing a method of any of aspects 1 through 10.

Aspect 24: A non-transitory computer-readable medium storing code for wireless communication at a UE, the code comprising instructions executable by a processor to perform a method of any of aspects 1 through 10.

Aspect 25: An apparatus for wireless communication at a base station, comprising a processor; memory coupled with the processor; and instructions stored in the memory and executable by the processor to cause the apparatus to perform a method of any of aspects 11 through 21.

Aspect 26: An apparatus for wireless communication at a base station, comprising at least one means for performing a method of any of aspects 11 through 21.

Aspect 27: A non-transitory computer-readable medium storing code for wireless communication at a base station, the code comprising instructions executable by a processor to perform a method of any of aspects 11 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving a first indication of a first set of random access occasions associated with a synchronization signal block, wherein the synchronization signal block corresponds with a first transmit beam of a network device and with a first receive beam of a first set of receive beams of the network device;
receiving a second indication of a second set of random access occasions that are each associated with the synchronization signal block and a respective receive beam of a second set of receive beams of the network device, wherein each receive beam of the second set of receive beams of the network device is associated with the synchronization signal block, has a narrower beam width than the first receive beam of the first set of receive beams of the network device, and spatially overlaps a portion of the first receive beam; and transmitting an initial random access message using a selected random access occasion of the second set of random access occasions, wherein the selected random access occasion corresponds to an associated receive beam of the second set of receive beams of the network device.

2. The method of claim 1, wherein transmitting the initial random access message comprises:

transmitting the initial random access message as an initial random access message of a two-step random access procedure or a four-step random access procedure.

3. The method of claim 1, further comprising:

transmitting the initial random access message using one of the first set of random access occasions;

determining that the UE failed to receive a random access response associated with the transmission of the initial random access message using the one of the first set of random access occasions; and determining to transmit the initial random access message using the selected random access occasion of the second set of random access occasions based at least in part on the failure to receive the random access response.

4. The method of claim 1, further comprising:

receiving, from the network device, a threshold for a reception metric of the synchronization signal block; and determining to transmit the initial random access message using the selected random access occasion of the second set of random access occasions based at least in part on whether the reception metric of the synchronization signal block satisfies the threshold.

5. The method of claim 4, wherein the reception metric comprises a reference signal received power (RSRP) metric or a signal-to-interference-plus-noise (SINR) metric.

6. The method of claim 1, further comprising:

receiving, from the network device, a threshold for a transmit power of the UE; and determining to transmit the initial random access message using the selected random access occasion of the second set of random access occasions based at least in part on whether the transmit power of the UE satisfies the threshold.

7. The method of claim 6, wherein the threshold comprises a maximum permissible exposure (MPE) threshold.

8. The method of claim 1, further comprising:

determining that the UE failed to receive a random access response message associated with the transmission of the initial random access message using the selected random access occasion of the second set of random access occasions; and transmitting, based at least in part on the failure to receive the random access response message, a second random access message using a second random access occasion of the second set of random access occasions, the second random access occasion associated with a different receive beam of the second set of receive beams than the selected random access occasion.

9. The method of claim 1, wherein the selected random access occasion is associated with a second receive beam of the second set of receive beams that is narrower than the first receive beam of the first set of receive beams, the method further comprising:

receiving, from the network device based at least in part on transmitting the initial random access message, a random access response message associated with the second receive beam.

10. The method of claim 1, wherein the first indication and the second indication are included in remaining minimum system information associated with the synchronization signal block.

11. A method for wireless communication at a network device, comprising:

transmitting a first indication of a first set of random access occasions associated with a synchronization signal block, wherein the synchronization signal block corresponds with a first transmit beam of the network device and with a first receive beam of a first set of receive beams of the network device;

transmitting a second indication of a second set of random access occasions that are each associated with the synchronization signal block and a respective receive beam of a second set of receive beams of the network device, wherein each receive beam of the second set of receive beams of the network device is associated with the synchronization signal block, has a narrower beam width than the first receive beam of the first set of receive beams of the network device, and spatially overlaps a portion of the first receive beam; and receiving, from a user equipment (UE) and using a first receive beam from the second set of receive beams, an initial random access message using a selected random access occasion of the second set of random access occasions, wherein the selected random access occasion corresponds to the first receive beam of the second set of receive beams and is associated with the synchronization signal block.

12. The method of claim 11, wherein receiving the initial random access message comprises:

receiving the initial random access message as an initial random access message of a two-step random access procedure or a four-step random access procedure.

13. The method of claim 11, further comprising:

monitoring for the initial random access message using a second random access occasion that precedes the selected random access occasion, the monitoring using a second receive beam from the first set of receive beams that is associated with the second random access occasion;

determining that the network device has failed to receive the initial random access message using the second random access occasion; and monitoring for the initial random access message using the selected random access occasion using the first receive beam from the second set of receive beams based at least in part on failing to receive the initial random access message using the second random access occasion.

14. The method of claim 11, further comprising:

transmitting a threshold for the UE to use as a basis for transmitting using the second set of random access occasions.

15. The method of claim 14, wherein the threshold is for a reception metric of the synchronization signal block.

16. The method of claim 15, wherein the reception metric comprises a reference signal received power (RSRP) metric or a signal-to-interference-plus-noise (SINR) metric.

17. The method of claim 14, wherein the threshold is for a transmit power of the UE.

18. The method of claim 17, wherein the threshold comprises a maximum permissible exposure (MPE) threshold.

19. The method of claim 11, further comprising:
transmitting, based at least in part on receiving the initial random access message, a random access response message to the UE using the first receive beam of the second set of receive beams.

20. The method of claim 11, further comprising:
transmitting a third indication of a third set of random access occasions associated with a second synchronization signal block that corresponds with a second receive beam of the first set of receive beams of the network device; and
transmitting a fourth indication of a fourth set of random access occasions that are each associated with a respective receive beam of a third set of receive beams, each receive beam of the third set of receive beams at least partially overlapping the second receive beam of the first set of receive beams.

21. The method of claim 20, wherein the third set of receive beams comprises a different quantity of receive beams than the first set of receive beams.

22. An apparatus for wireless communication at a user equipment (UE), comprising:
one or more processors;
one or more memories coupled with the one or more processors; and
one or more processor-readable instructions stored in the one or more memories and executable by the one or more processors to cause the apparatus to:
receive a first indication of a first set of random access occasions associated with a synchronization signal block, wherein the synchronization signal block corresponds with a first transmit beam of a network device and with a first receive beam of a first set of receive beams of the network device;
receive a second indication of a second set of random access occasions that are each associated with the synchronization signal block and a respective receive beam of a second set of receive beams of the network device, wherein each receive beam of the second set of receive beams of the network device is associated with the synchronization signal block, has a narrower beam width than the first receive beam of the first set of receive beams of the network device, and spatially overlaps a portion of the first receive beam; and
transmit an initial random access message using a selected random access occasion of the second set of random access occasions, wherein the selected random access occasion corresponds to an associated receive beam of the second set of receive beams of the network device.

23. The apparatus of claim 22, wherein the instructions to transmit the initial random access message are executable by the one or more processors to cause the apparatus to:
transmit the initial random access message as an initial random access message of a two-step random access procedure or a four-step random access procedure.

24. The apparatus of claim 22, wherein the instructions are further executable by the one or more processors to cause the apparatus to:
transmit the initial random access message using one of the first set of random access occasions;
determine that the UE failed to receive a random access response associated with the transmission of the initial random access message using the one of the first set of random access occasions; and
determine to transmit the initial random access message using the selected random access occasion of the second set of random access occasions based at least in part on the failure to receive the random access response.

25. The apparatus of claim 22, wherein the instructions are further executable by the one or more processors to cause the apparatus to:
receive, from the network device, a threshold for a reception metric of the synchronization signal block; and
determine to transmit the initial random access message using the selected random access occasion of the second set of random access occasions based at least in part on whether the reception metric of the synchronization signal block satisfies the threshold.

26. The apparatus of claim 22, wherein the instructions are further executable by the one or more processors to cause the apparatus to:
receive, from the network device, a threshold for a transmit power of the UE; and
determine to transmit the initial random access message using the selected random access occasion of the second set of random access occasions based at least in part on whether the transmit power of the UE satisfies the threshold.

27. An apparatus for wireless communication at a network device, comprising:
one or more processors;
one or more memories coupled with the one or more processors; and
one or more processor-readable instructions stored in the one or more memories and executable by the one or more processors to cause the apparatus to:
transmit a first indication of a first set of random access occasions associated with a synchronization signal block, wherein the synchronization signal block corresponds with a first transmit beam of the network device and with a first receive beam of a first set of receive beams of the network device;
transmit a second indication of a second set of random access occasions that are each associated with the synchronization signal block and with a respective receive beam of a second set of receive beams of the network device, wherein each receive beam of the second set of receive beams of the network device is associated with the synchronization signal block, has a narrower beam width than the first receive beam of the first set of receive beams of the network device, and spatially overlaps a portion of the first receive beam; and
receive, from a user equipment (UE) and using a first receive beam from the second set of receive beams, an initial random access message using a selected random access occasion of the second set of random access occasions, wherein the selected random access occasion corresponds to the first receive beam of the second set of receive beams, the first receive beam being associated with the synchronization signal block.

28. The apparatus of claim 27, wherein the instructions to receive the initial random access message are executable by the one or more processors to cause the apparatus to:

receive the initial random access message as an initial random access message of a two-step random access procedure or a four-step random access procedure.

29. The apparatus of claim 27, wherein the instructions are further executable by the one or more processors to cause the apparatus to:
monitor for the initial random access message using a second random access occasion that precedes the selected random access occasion, the monitoring using a second receive beam from the first set of receive beams that is associated with the second random access occasion;
determine that the network device has failed to receive the initial random access message using the second random access occasion; and
monitor for the initial random access message using the selected random access occasion using the first receive beam of the second set of receive beams based at least in part on failing to receive the initial random access message using the second random access occasion.

30. The apparatus of claim 27, wherein the instructions are further executable by the one or more processors to cause the apparatus to:
transmit a threshold for the UE to use as a basis for transmitting using the second set of random access occasions.

* * * * *